United States Patent
Maruyama

(10) Patent No.: US 10,846,077 B2
(45) Date of Patent: Nov. 24, 2020

(54) INFORMATION PROCESSING DEVICE, ELEVATOR DEVICE, AND PROGRAM UPDATE METHOD

(71) Applicant: Mitsubishi Electric Corporation, Chiyoda-ku (JP)

(72) Inventor: Kiyoyasu Maruyama, Tokyo (JP)

(73) Assignee: Mitsubishi Electric Corporation, Paris ( * ) Notice: Subject to any disclaimer, the term of this patent is extended or adjusted under 35 U.S.C. 154(b) by 0 days.

(21) Appl. No.: 15/765,656

(22) PCT Filed: Dec. 14, 2015

(86) PCT No.: PCT/JP2015/084913
§ 371 (c)(1),
(2) Date: Apr. 3, 2018

(87) PCT Pub. No.: WO2017/103971
PCT Pub. Date: Jun. 22, 2017

(65) Prior Publication Data
US 2018/0300119 A1 Oct. 18, 2018

(51) Int. Cl.
*G06F 8/65* (2018.01)
*G06F 11/07* (2006.01)
(Continued)

(52) U.S. Cl.
CPC ............. *G06F 8/65* (2013.01); *B66B 1/3446* (2013.01); *B66B 5/0012* (2013.01);
(Continued)

(58) Field of Classification Search
CPC ........ G06F 8/65; G06F 8/654; G06F 11/1433; G06F 21/572; G06F 3/0679;
(Continued)

(56) References Cited

U.S. PATENT DOCUMENTS 6,578,675 B2 * 6/2003 Wilson .................... B66B 3/008
187/247
7,739,490 B2 * 6/2010 Shiiba ................. G06F 11/1417
713/1
(Continued)

FOREIGN PATENT DOCUMENTS

JP    2006-31526 A    2/2006
JP    2015-5041 A    1/2015

OTHER PUBLICATIONS

International Search Report and Written Opinion dated Mar. 15, 2016 in PCT/JP2015/084913 filed Dec. 14, 2015 (with English language translation of International Search Report only).

(Continued)

*Primary Examiner* — S. Sough
*Assistant Examiner* — Cheneca Smith
(74) *Attorney, Agent, or Firm* — Oblon, McClelland, Maier & Neustadt, L.L.P.

(57) ABSTRACT

An information processing device includes: a memory that stores therein a main program; a processor that reads out and executes the main program stored in the memory; a program update unit that updates the main program stored in the memory; and a start control unit that starts the processor in an update confirmation mode when the processor is reset after the main program stored in the memory is updated by the program update unit. The processor, when being started in the update confirmation mode, generates a monitoring process that monitors whether a process generated by the execution of the main program is normally operated, and outputs a monitoring process start completion signal when the monitoring process has been normally generated. The information processing device can reduce time required for processing of confirming whether each program have been normally updated after the update of the programs.

5 Claims, 18 Drawing Sheets

(51) Int. Cl.
    *G06F 11/14*     (2006.01)
    *G06F 11/16*     (2006.01)
    *G06F 11/30*     (2006.01)
    *B66B 1/34*     (2006.01)
    *B66B 5/00*     (2006.01)

(52) U.S. Cl.
    CPC ...... *G06F 11/0757* (2013.01); *G06F 11/1433* (2013.01); *G06F 11/16* (2013.01); *G06F 11/3024* (2013.01); *G06F 11/1629* (2013.01)

(58) Field of Classification Search
    CPC .. G06F 11/0757; G06F 11/16; G06F 11/3024; G06F 11/1629; B66B 1/3446; B66B 5/0012
    See application file for complete search history.

(56) References Cited

U.S. PATENT DOCUMENTS

| | | | | |
|---|---|---|---|---|
| 7,761,734 | B2* | 7/2010 | Ellsworth | G06F 11/1433 714/15 |
| 2002/0066621 | A1* | 6/2002 | Wilson | B66B 3/008 187/391 |
| 2007/0074015 | A1* | 3/2007 | Shiiba | G06F 11/1417 713/1 |
| 2007/0214386 | A1* | 9/2007 | Watanabe | G06F 11/2284 714/13 |
| 2008/0256525 | A1* | 10/2008 | Ellsworth | G06F 8/60 717/168 |

OTHER PUBLICATIONS

International Preliminary Report on Patentability and Written Opinion dated Jun. 28, 2018 in PCT/JP2015/084913 (English Translation only), 6 pages.

Office Action dated Sep. 17, 2019 in Korean Application No. 10-2018-7016032 (w/computer-generated English translation).

Korean Office Action dated Mar. 11, 2020 in Patent Application No. 10-2018-7016032 (with English translation), 7 pages.

* cited by examiner

10: INFORMATION PROCESSING DEVICE

FIG. 5A

[UPDATE CONFIRMATION FLAG]

| PROGRAM 1A | VALID |
|---|---|
| PROGRAM 1B | VALID |

(a) STEADY-STATE

FIG. 5B

[UPDATE CONFIRMATION FLAG]

| PROGRAM 1A | INVALID |
|---|---|
| PROGRAM 1B | VALID |

(b) IMMEDIATELY AFTER PROGRAM 1A IS UPDATED

FIG. 5C

[UPDATE CONFIRMATION FLAG]

| PROGRAM 1A | VALID |
|---|---|
| PROGRAM 1B | INVALID |

(c) IMMEDIATELY AFTER PROGRAM 1B IS UPDATED

FIG. 6A

[UPDATE CONFIRMATION FLAG]

| PROGRAM 2A | VALID |
|---|---|
| PROGRAM 2B | VALID |

(a) STEADY-STATE

FIG. 6B

[UPDATE CONFIRMATION FLAG]

| PROGRAM 2A | INVALID |
|---|---|
| PROGRAM 2B | VALID |

(b) IMMEDIATELY AFTER PROGRAM 2A IS UPDATED

FIG. 6C

[UPDATE CONFIRMATION FLAG]

| PROGRAM 2A | VALID |
|---|---|
| PROGRAM 2B | INVALID |

(c) IMMEDIATELY AFTER PROGRAM 1B IS UPDATED

FIG. 8

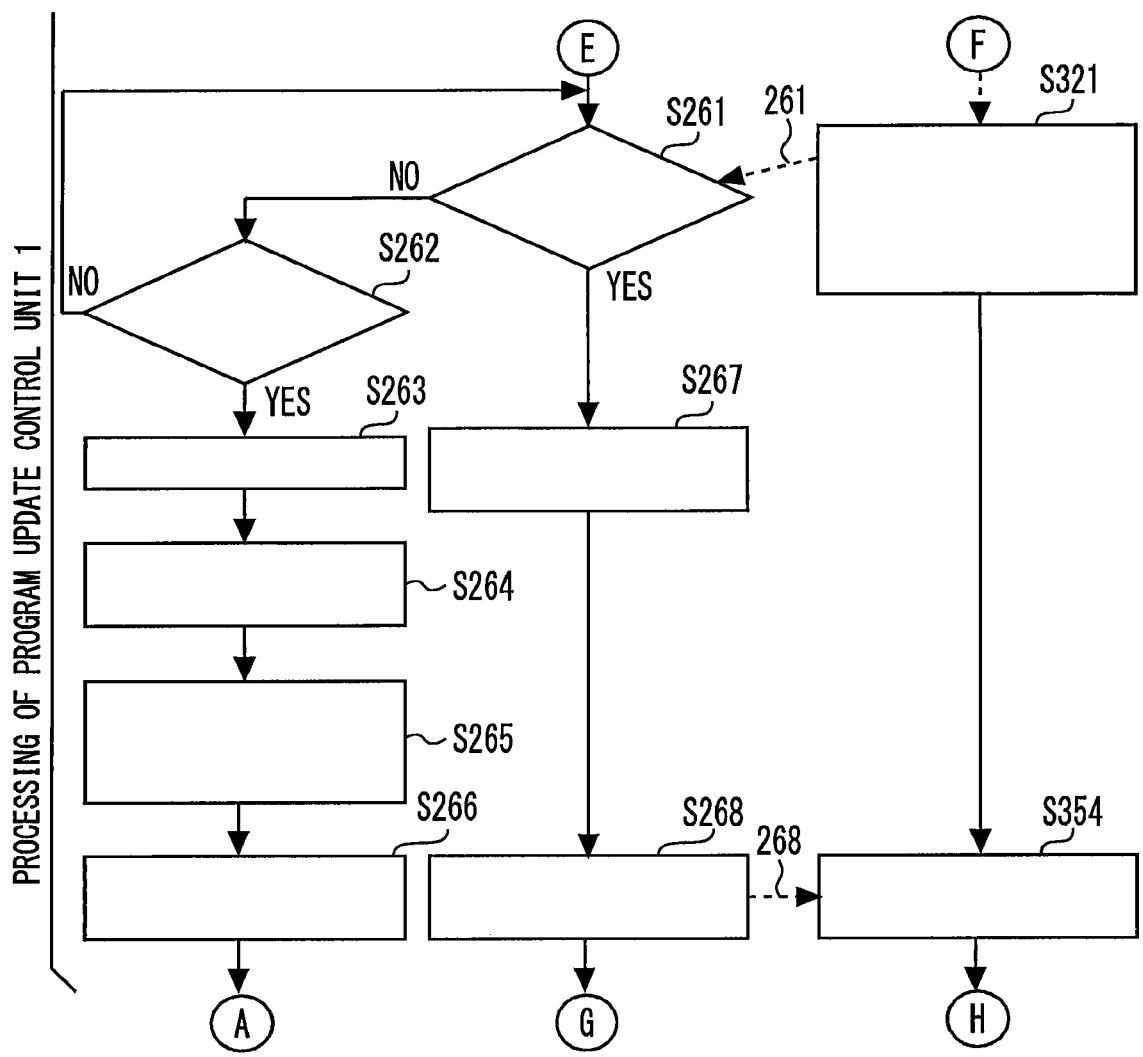

S261: IS START COMPLETION NOTIFICATION RECEIVED?
S262: IS TIMER SET TO ZERO?
S263: RECORD LOG
S264: SET UPDATE CONFIRMATION FLAG SIGNAL 1 TO INVALID
S265: RESET PROCESSOR 2 WITH RESET CONTROL SIGNAL 1
S266: RESET PROCESSOR 1
S267: SET UPDATE CONFIRMATION FLAG SIGNAL 1 TO INVALID
S268: CONTROL PROGRAM UPDATE AND TRANSMIT COMPLETION NOTIFICATION
S321: COMPLETE MAIN PROGRAM START IN UPDATE CONFIRMATION MODE AND INVALIDATE START CONFIRMATION FLAG
S354: CONTROL PROGRAM UPDATE AND RECEIVE COMPLETION NOTIFICATION

S271: EXECUTE UPDATE PROGRAM
S272: VALIDATE UPDATE FLAG AND NOTIFY PROCESSOR 2
       OF UPDATE COMPLETION
S361: INSTRUCT PROCESSOR 1 TO EXECUTE UPDATED PROGRAM
S362: HAS EXECUTION OF UPDATED PROGRAM COMPLETED?
S363: HAS ERROR OCCURRED IN UPDATED PROGRAM
S364: RECORD LOG
S365: SET UPDATE CONFIRMATION FLAG SIGNAL 2 TO VALID
S366: RESET PROCESSOR 1 WITH RESET CONTROL SIGNAL 2
S367: START TIMER 2

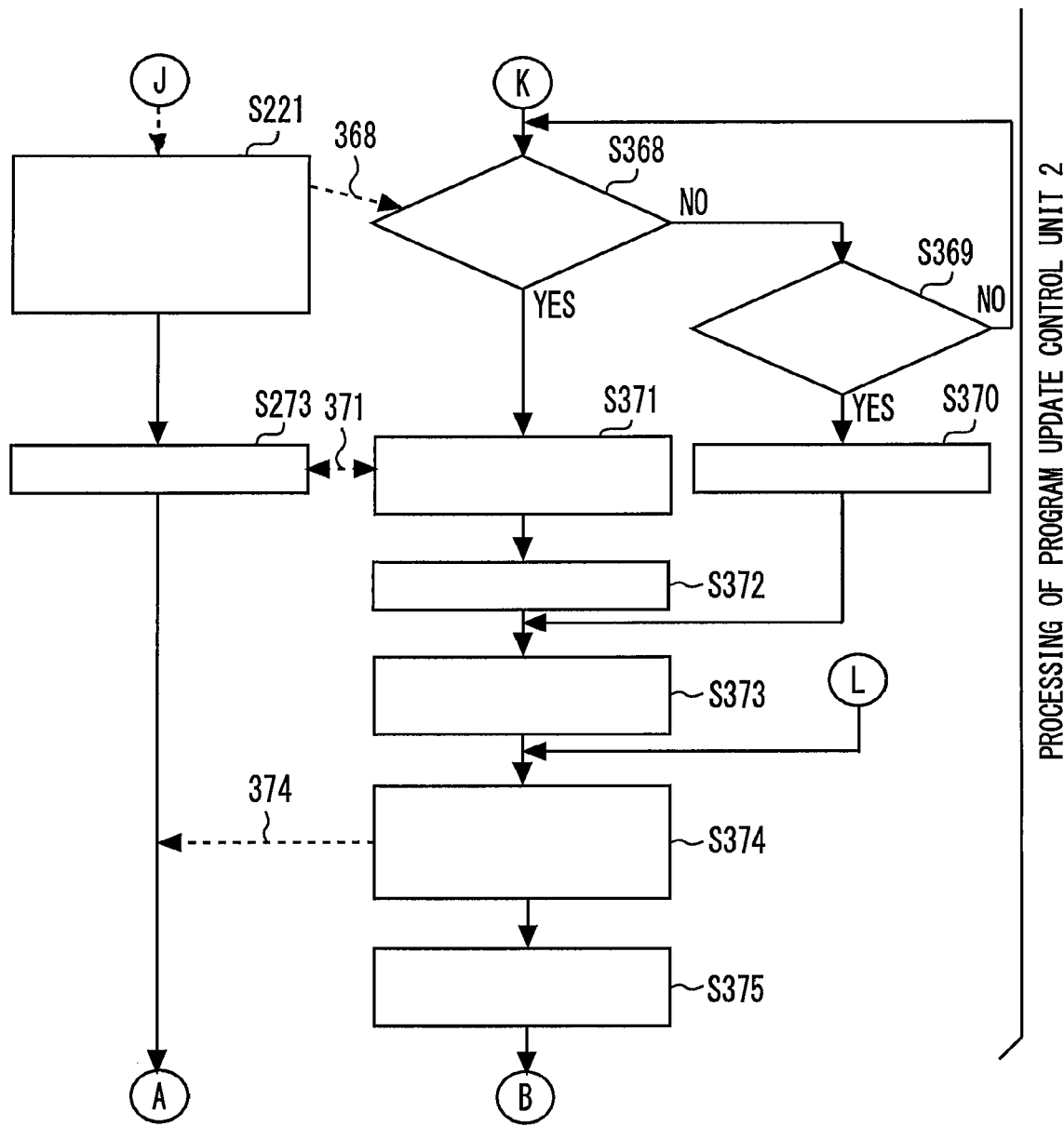

FIG. 10

S221: COMPLETE START OF MAIN PROGRAM IN UPDATE CONFIRMATION MODE AND INVALIDATE START CONFIRMATION FLAG
S273: UPDATE START DESIGNATION FLAG
S368: HAS START COMPLETION NOTIFICATION BEEN RECEIVED?
S369: IS TIMER SET TO ZERO?
S370: RECORD LOG
S371: INSTRUCT START DESIGNATION FLAG UPDATE
S372: UPDATE START DESIGNATION FLAG
S373: SET UPDATE CONFIRMATION FLAG SIGNAL 2 TO INVALID
S374: RESET PROCESSOR 1 WITH RESET CONTROL SIGNAL 2
S375: RESET PROCESSOR 2

S219: NORMALLY OPERATE MAIN PROGRAM
S319: NORMALLY OPERATE MAIN PROGRAM
S401: INVALIDATE START CONFIRMATION FLAG
S402: RESET PROCESSOR 2 WITH RESET CONTROL SIGNAL 1
S403: RESET PROCESSOR 1

FIG. 16

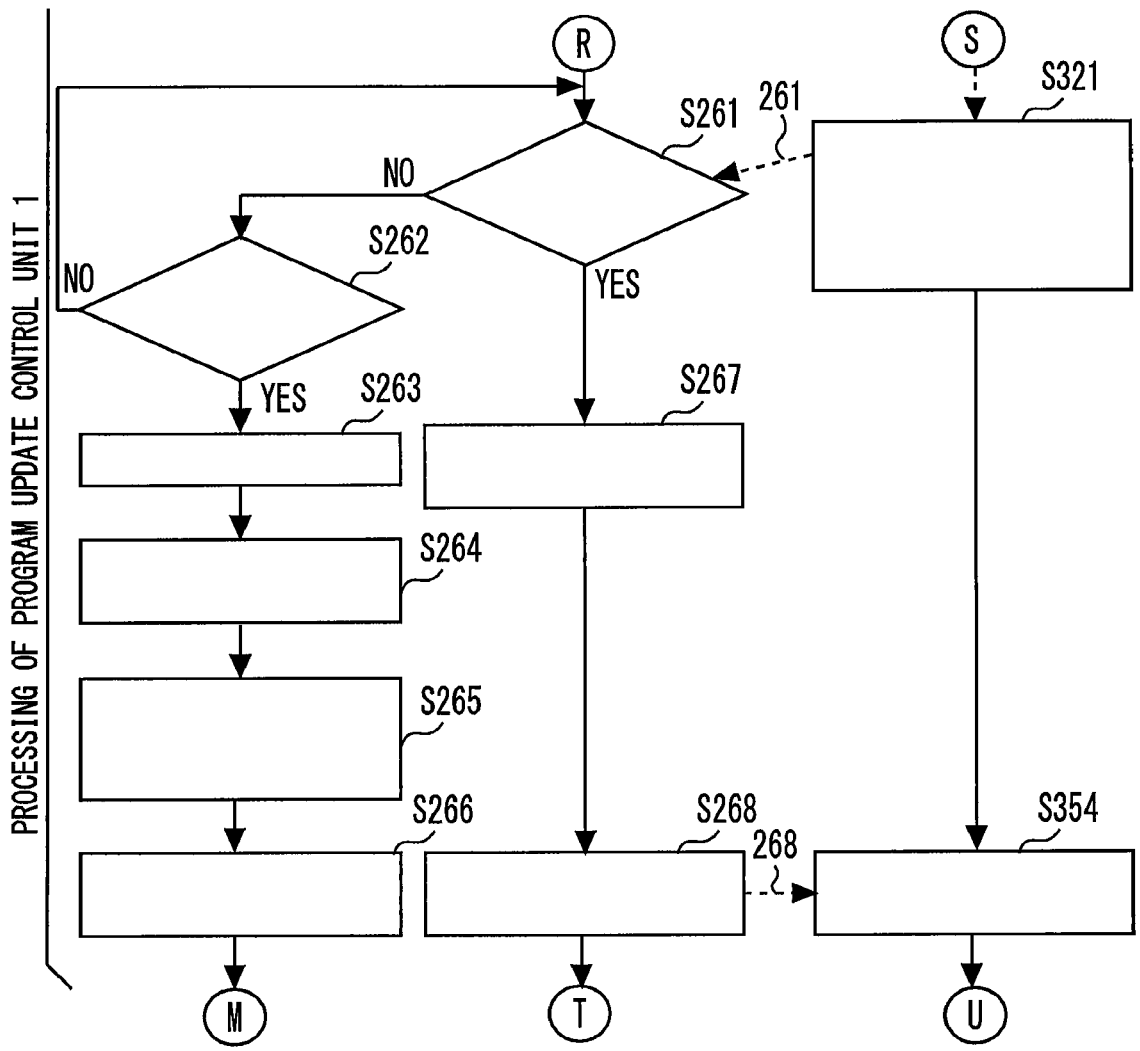

S261: IS START COMPLETION NOTIFICATION RECEIVED?
S262: IS TIMER SET TO ZERO?
S263: RECORD LOG
S264: SET UPDATE CONFIRMATION FLAG SIGNAL 1 TO INVALID
S265: RESET PROCESSOR 2 WITH RESET CONTROL SIGNAL 1
S266: RESET PROCESSOR 1
S267: SET UPDATE CONFIRMATION FLAG SIGNAL 1 TO INVALID
S268: CONTROL PROGRAM UPDATE AND TRANSMIT COMPLETION NOTIFICATION
S321: COMPLETE MAIN PROGRAM START IN UPDATE CONFIRMATION MODE
      AND INVALIDATE START CONFIRMATION FLAG
S354: CONTROL PROGRAM UPDATE AND RECEIVE COMPLETION NOTIFICATION

S271: EXECUTE UPDATE PROGRAM
S272: VALIDATE UPDATE FLAG AND NOTIFY PROCESSOR 2
       OF UPDATE COMPLETION
S361: INSTRUCT PROCESSOR 1 TO EXECUTE UPDATED PROGRAM
S362: HAS EXECUTION OF UPDATED PROGRAM COMPLETED?
S363: HAS ERROR OCCURRED IN UPDATED PROGRAM
S364: RECORD LOG
S365: SET UPDATE CONFIRMATION FLAG SIGNAL 2 TO VALID
S366: RESET PROCESSOR 1 WITH RESET CONTROL SIGNAL 2
S367: START TIMER 2

S221: COMPLETE START OF MAIN PROGRAM IN UPDATE CONFIRMATION MODE AND INVALIDATE START CONFIRMATION FLAG
S368: HAS START COMPLETION NOTIFICATION BEEN RECEIVED?
S369: IS TIMER SET TO ZERO?
S370: RECORD LOG
S372: UPDATE START DESIGNATION FLAG
S373: SET UPDATE CONFIRMATION FLAG SIGNAL 2 TO INVALID
S374: RESET PROCESSOR 1 WITH RESET CONTROL SIGNAL 2
S375: RESET PROCESSOR 2

INFORMATION PROCESSING DEVICE, ELEVATOR DEVICE, AND PROGRAM UPDATE METHOD

FIELD

The present invention relates to an information processing device, an elevator device, and a program update method.

BACKGROUND

There has been known an information processing device that includes: a first computer; a second computer; non-volatile first memory means that stores therein a first information processing program to be executed by the first computer; and non-volatile second memory means that stores therein a second information processing program to be executed by the second computer, the information processing device being provided with: acquisition means that acquires, and stores in the first memory means, first update data containing data for updating the first information processing program and second update data containing data for updating the second information processing program; first update means that updates the first information processing program stored in the first memory means based on the first update data; transmission means that transmits the second update data to the second computer; and second update means that updates the second information processing program stored in the second memory means based on the second update data transmitted from the transmission means (see PTL 1, for example).

CITATION LIST

Patent Literature

[PTL 1] JP 2006-031526 A
[PTL 2] JP 2015-005041 A

SUMMARY

Technical Problem

The conventional information processing device thus disclosed in PTL 1 can update individual programs to be executed by a plurality of computers, i.e., a plurality of processors at a time. However, since the conventional information processing device performs confirmation processing on the whole of each of a plurality of programs when confirming whether the programs have been normally updated, the confirmation processing takes time, and the device cannot be restarted promptly after the programs have been updated.

The present invention has been made to solve the above problems, and an object of the present invention is to provide an information processing device, an elevator device, and a program update method capable of reducing time required for processing of confirming whether programs to be executed by processors have been normally updated after the update of the programs, and restarting the device promptly after the update of the programs.

Solution to Problem

An information processing device according to the present invention includes: a first memory configured to store therein a first main program; a first processor configured to read out and to execute the first main program stored in the first memory; a first program update unit configured to update the first main program stored in the first memory; and a first start control unit configured to start the first processor in an update confirmation mode when the first processor is reset after the first main program stored in the first memory is updated by the first program update unit, wherein the first processor, when being started in the update confirmation mode, generates a first monitoring process that monitors whether a process generated by the execution of the first main program is normally operated, and outputs a first monitoring process start completion signal when the first monitoring process has been normally generated.

An elevator device according to the present invention includes the information processing device mentioned above that further includes: a second memory configured to store therein a second main program; a second processor configured to read out and to execute the second main program stored in the second memory; a second program update unit configured to update the second main program stored in the second memory; and a second start control unit configured to start the second processor in an update confirmation mode when the second processor is reset after the second main program stored in the second memory is updated by the second program update unit, wherein the second processor, when being started in the update confirmation mode, generates a second monitoring process that monitors whether a process generated by an execution of the second main program is normally operated, and outputs a second monitoring process start completion signal to the first processor when the second monitoring process has been normally generated, and the first processor outputs the first monitoring process start completion signal to the second processor when the first monitoring process has been normally generated in the update confirmation mode. And the elevator device further includes: a camera provided inside an elevator car, the camera configured to photograph the inside of the car and to output an analog image signal to the information processing device, and a monitor provided inside the car, the monitor configured to receive an input of a digital image signal from the information processing device to display an image thereon, wherein the first processor processes the digital image signal output to the monitor from the information processing device, and the second processor processes the analog image signal input to the information processing device from the camera.

A program update method according to the present invention of updating a main program stored in a memory in an information processing device that includes the memory storing therein the main program, and a processor reading out and executing the main program stored in the memory, includes: a first step of updating the main program stored in the memory; a second step of starting the processor in an update confirmation mode when the processor is reset after the main program stored in the memory is updated in the first step; and a third step of, by the processor started in the update confirmation mode, generating a monitoring process that monitors whether a process generated by the execution of the main program is normally operated, and outputting a monitoring process start completion signal when the monitoring process has been normally generated.

Advantageous Effects of Invention

The information processing device, the elevator device, and the program update method according to the present invention have effects of reducing time required for processing of confirming whether programs have been normally updated after the programs executed by processors have been updated, and restarting the device promptly after the update of the programs.

BRIEF DESCRIPTION OF THE DRAWINGS

FIG. 5 is a diagram explaining a start confirmation flag stored in a first non-volatile memory included in the information processing device according to Embodiment 1 of the present invention.

FIG. 6 is a diagram explaining a start confirmation flag stored in a second non-volatile memory included in the information processing device according to Embodiment 1 of the present invention.

FIG. 8 is a flowchart illustrating program update processing of the information processing device according to Embodiment 1 of the present invention.

FIG. 10 is a flowchart illustrating program update processing of the information processing device according to Embodiment 1 of the present invention.

FIG. 16 is a flowchart illustrating program update processing of the information processing device according to Embodiment 2 of the present invention.

DESCRIPTION OF EMBODIMENTS

Figure 1:
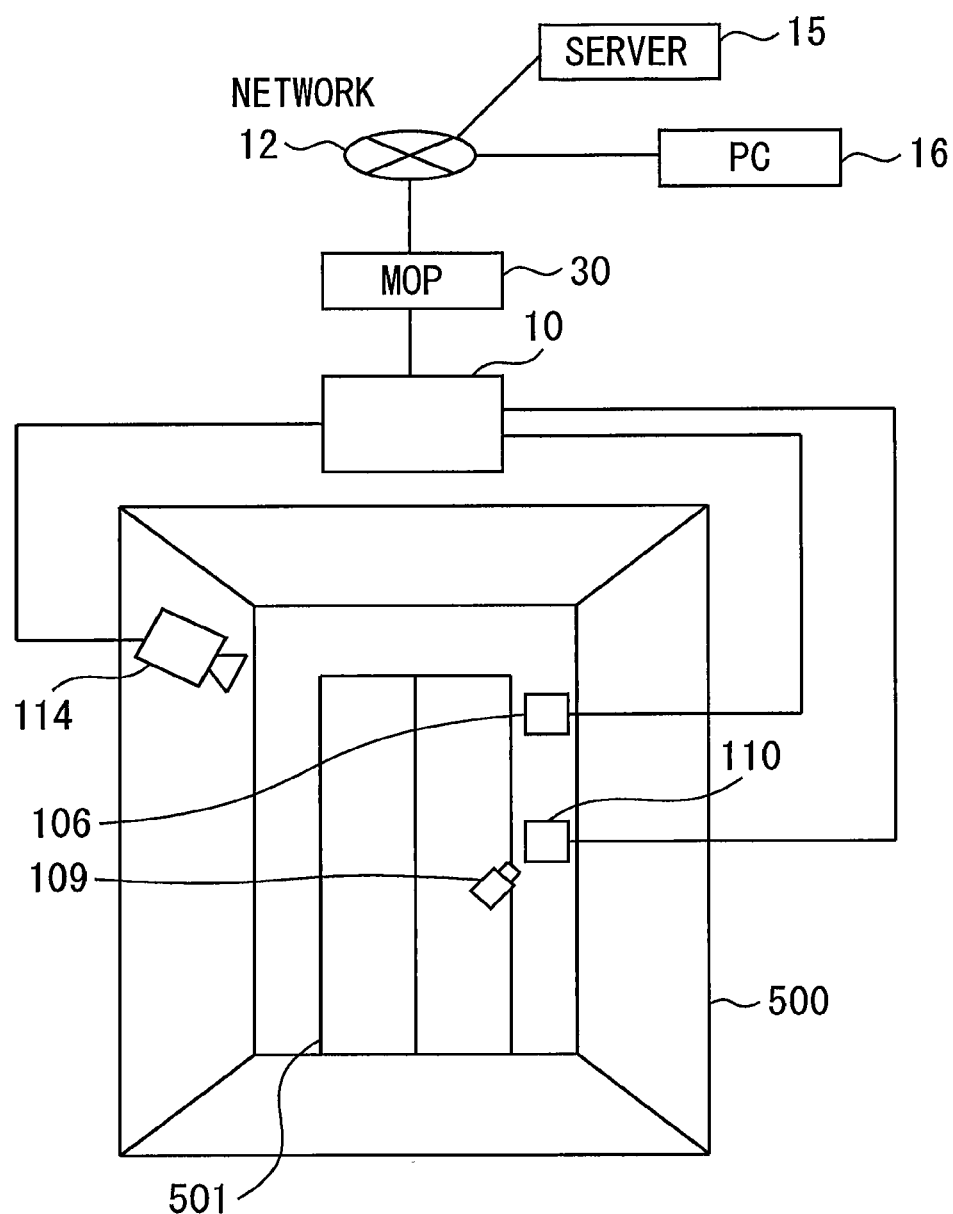
FIG. 1 is a diagram illustrating a configuration of an elevator device provided with an information processing device according to Embodiment 1 of the present invention.

Embodiments of the present invention will be described with reference to the accompanying drawings. In the drawings, the same reference numerals are applied to the same or equivalent parts, and the duplicated explanation thereof is simplified or omitted as appropriate. The present invention is not limited to the following embodiments, but various modifications can be made without departing from the spirit of the present invention. Hereinafter, in the drawings, each part whose name includes a term "first" or "second" at a head thereof, for convenience, is denoted with a numeral "1" or "2" at an end thereof.

Embodiment 1

Figure 2:
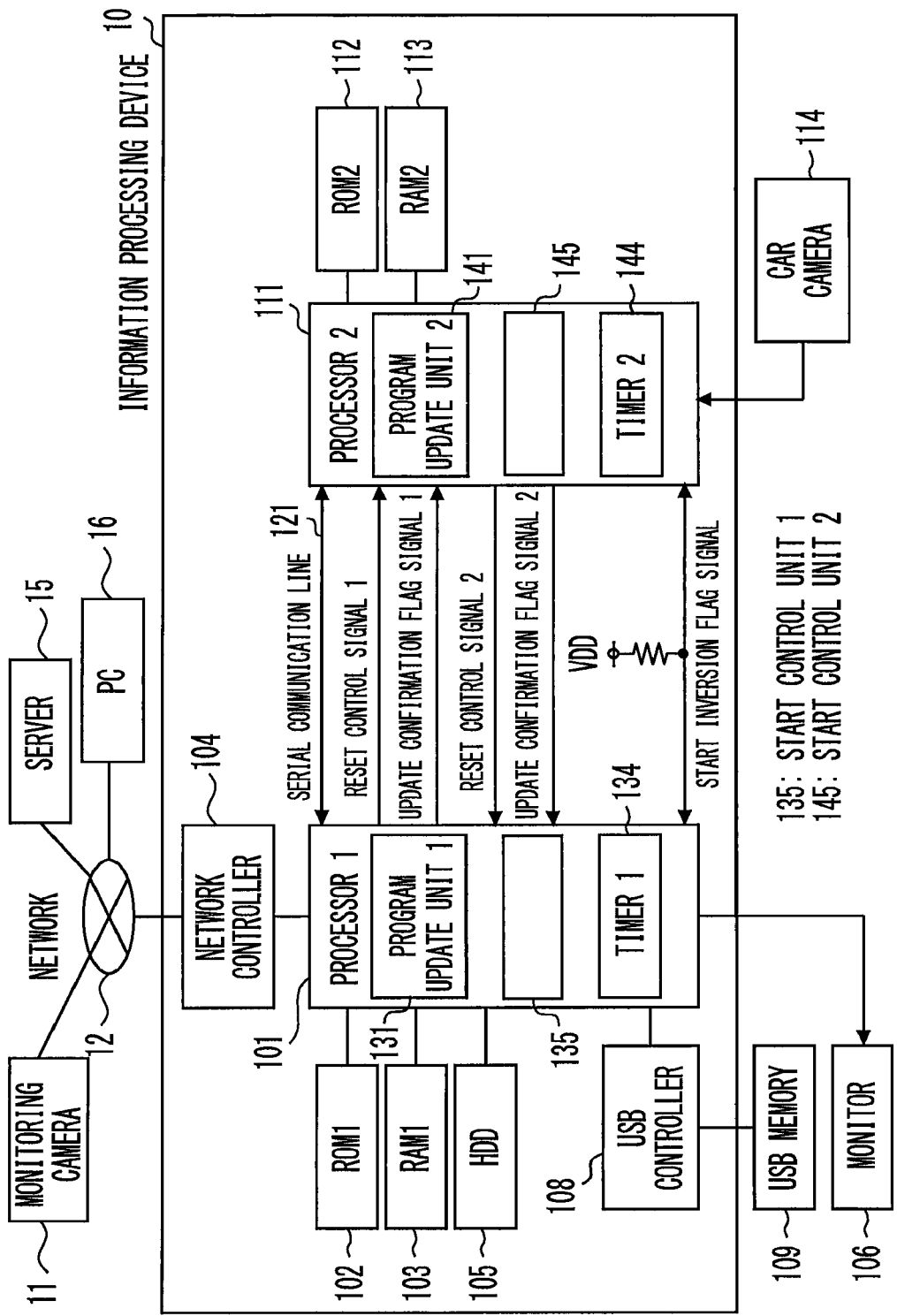
FIG. 2 is a block diagram illustrating a configuration of the information processing device according to Embodiment 1 of the present invention.
Figure 3:
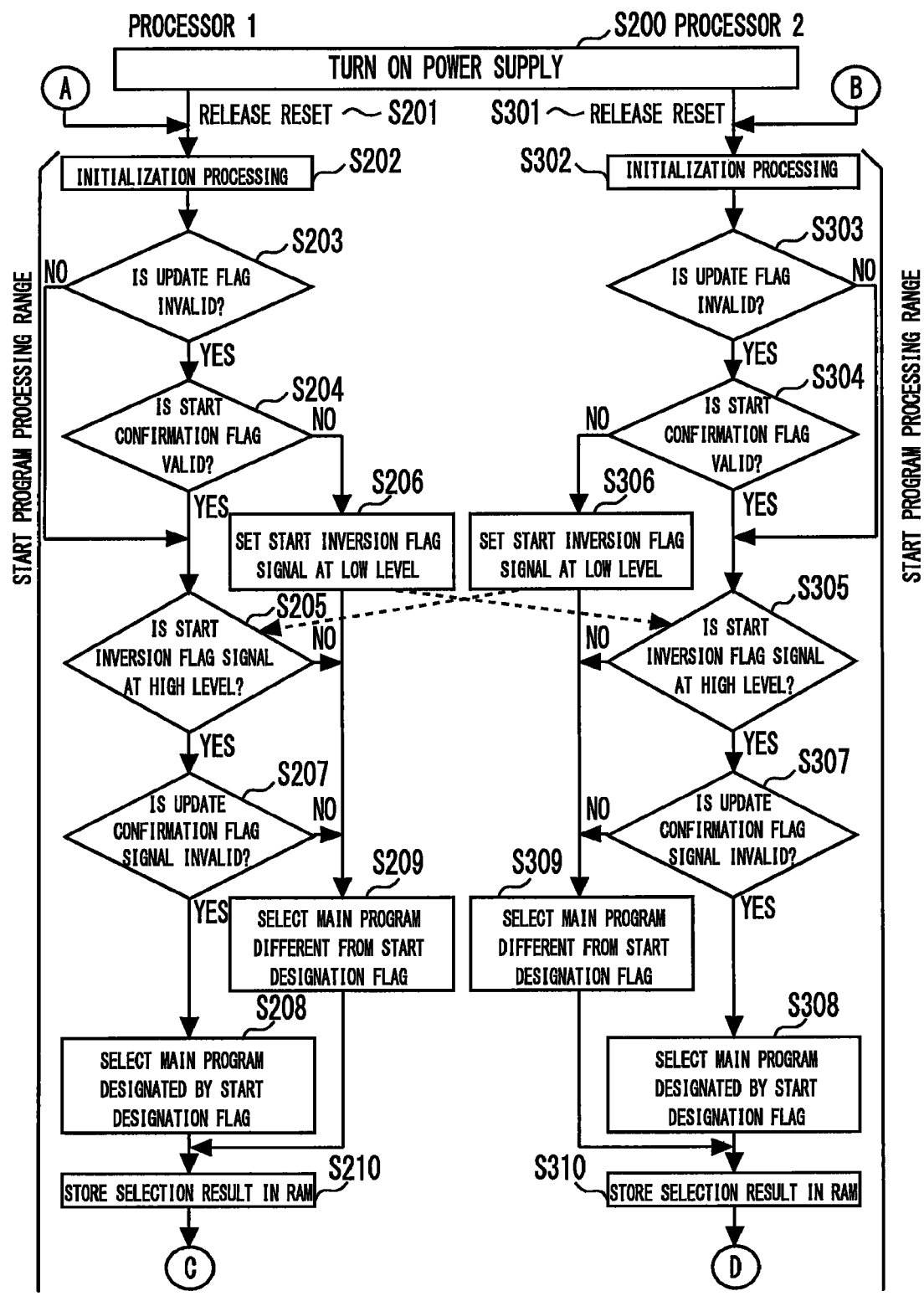
FIG. 3 is a flowchart illustrating start processing of the information processing device according to Embodiment 1 of the present invention.
Figure 4:
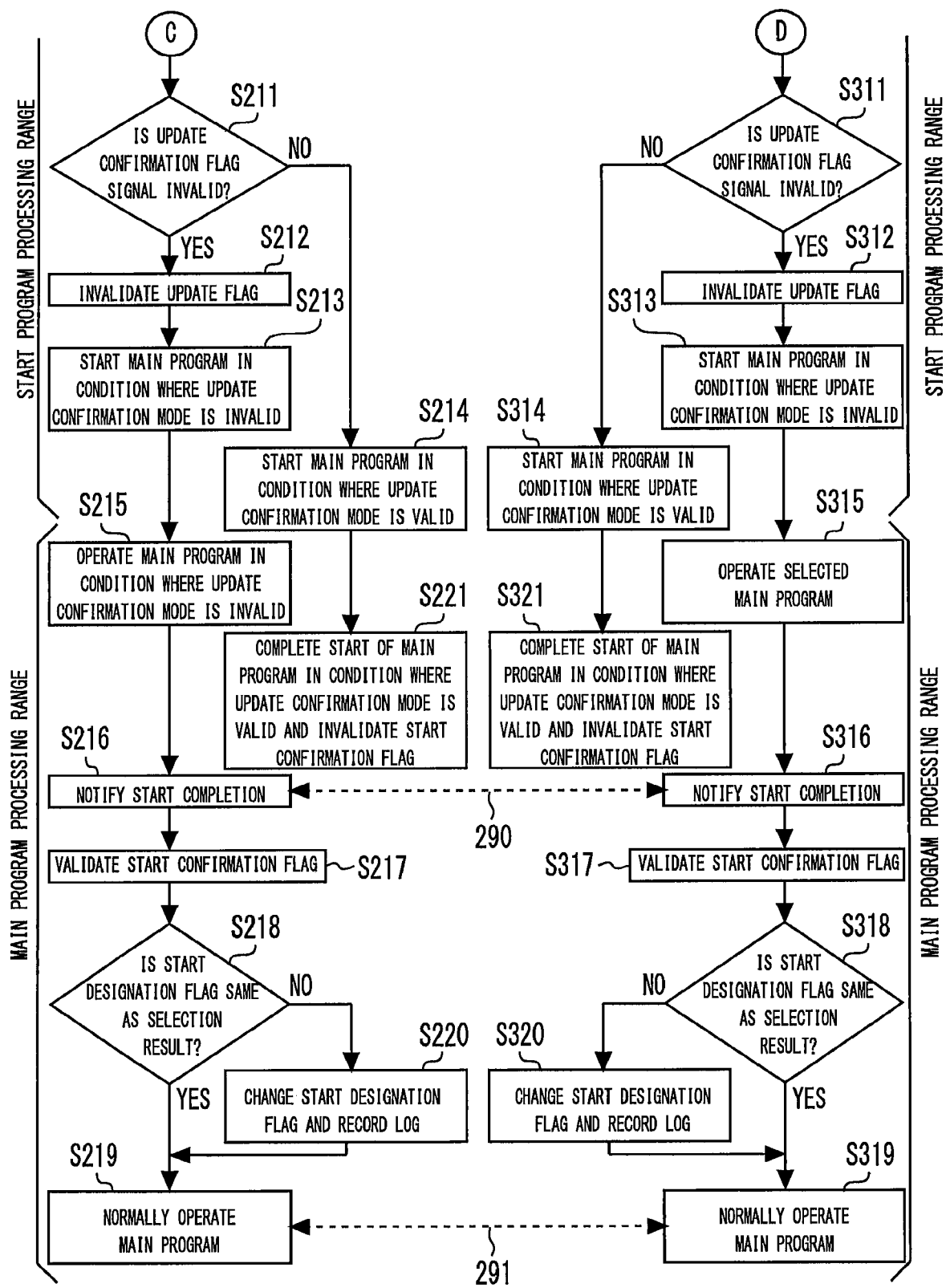
FIG. 4 is a flowchart illustrating start processing of the information processing device according to Embodiment 1 of the present invention.
Figure 11:
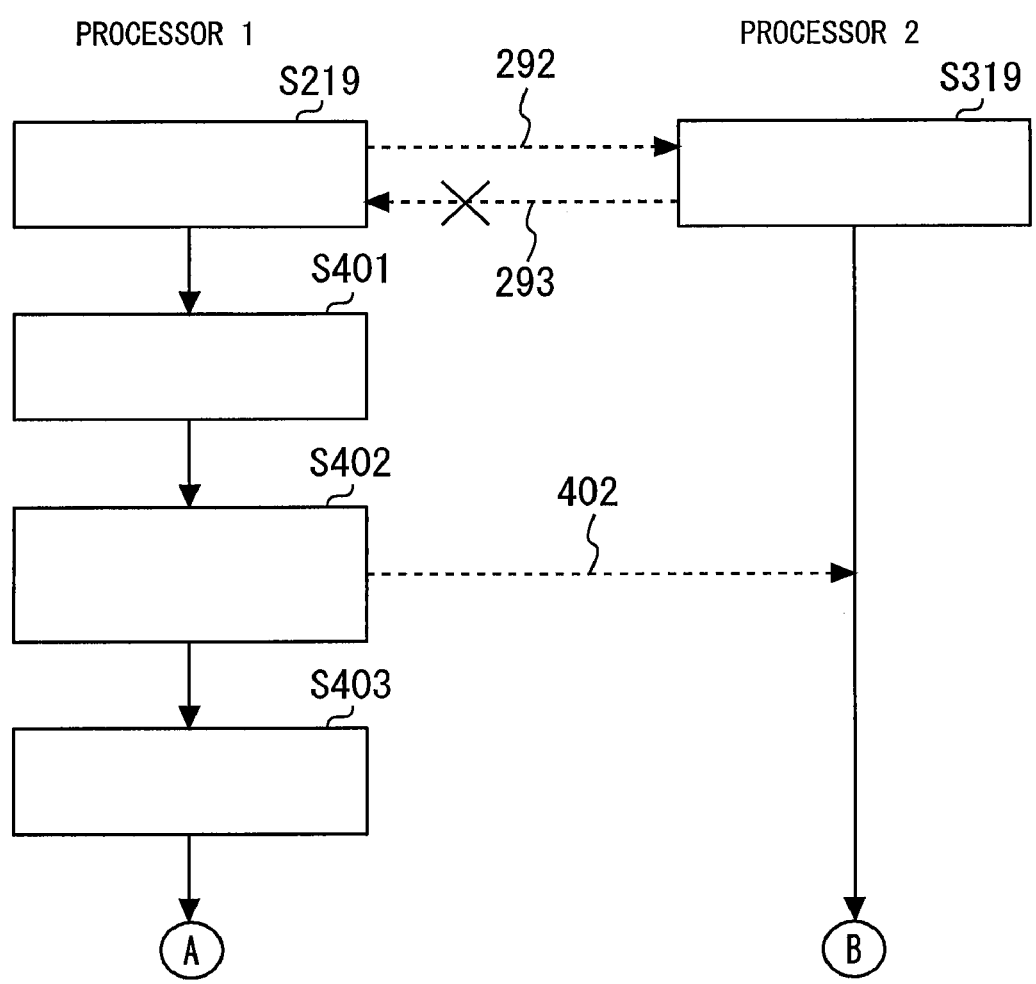
FIG. 11 is a flowchart illustrating processing in an abnormal operation of a main program of the information processing device according to Embodiment 1 of the present invention.

FIG. 1 to FIG. 11 are diagrams according to Embodiment 1 of the present invention. FIG. 1 is a diagram illustrating a configuration of an elevator device provided with an information processing device. FIG. 2 is a block diagram illustrating a configuration of the information processing device. FIG. 3 and FIG. 4 each are a flowchart illustrating start processing of the information processing device. FIG. 5 is a diagram explaining a start confirmation flag stored in a first non-volatile memory included in the information processing device. FIG. 6 is a diagram explaining a start confirmation flag stored in a second non-volatile memory included in the information processing device. FIG. 7 to FIG. 10 each are a flowchart illustrating program update processing of the information processing device. FIG. 11 is a flowchart illustrating processing in an abnormal operation of a main program of the information processing device.

In Embodiment 1, an example will be described in which an information processing device 10 according to the present invention is applied to the elevator device. Note that the information processing device 10 according to the present invention can be widely applied not only to the elevator device described herein but also to an information processing device in which the main program to be executed by a processor needs to be updated.

As illustrated in FIG. 1, in Embodiment 1, the elevator device to which the information processing device 10 is applied includes an elevator car 500. The car 500 is installed in an elevator hoistway (not illustrated) so that it can move freely up and down. The hoistway is provided in a building in which the elevator device is installed, for example.

The car 500 has a rectangular parallelepiped box shape, for example. A car entrance (not illustrated) is formed in, for example, a front surface of the car 500. The car entrance is an opening to allow users of an elevator to enter and exit the car 500. The car 500 is provided with a car door 501 for opening and closing the car entrance.

A car camera 114 is installed inside the car 500. The car camera 114 photographs a condition inside the car 500 as an image. The car camera 114 outputs the photographed image with an analog image signal. The analog image signal output from the car camera 114 is input to the information processing device 10.

Note that the image photographed by the car camera 114 may be a still image or a moving image. Specifically, the analog image signal output from the car camera 114 is an NTSC (National Television System Committee) format signal, for example.

A monitor 106 is installed inside the car 500. The monitor 106 is adapted to display various pieces of information to users inside the car 500.

The information processing device 10 is communicatably connected with a monitor panel 30 (MOP: MOnitor Panel). The monitor panel 30 is connected with a controller (not illustrated) of the elevator. The monitor panel 30 can acquire various pieces of information on the elevator from the controller of the elevator. Specifically, the information on the elevator includes information on a running condition, a running direction, and a current position of the elevator car 500, for example.

The information on the elevator acquired by the monitor panel 30 is transmitted to the information processing device 10. The information processing device 10 generates an image data to be displayed on the monitor 106 based on the information on the elevator. Then, the information processing device 10 outputs the generated image data to the monitor 106 with a digital image signal. The monitor 106 receives input of the digital image signal from the information processing device 10, and displays the image.

Note that the image displayed on the monitor 106 may be a still image or a moving image. Specifically, the image displayed on the monitor 106 is an image obtained by decompressing compressed video data compressed in an MPEG (Moving Picture Experts Group) format, for example.

A configuration of the information processing device 10 will be further described, also with reference to FIG. 2. The information processing device 10 includes a first processor 101 and a second processor 111. The first processor 101 and the second processor 111 each are a central processing unit (CPU: Central Processing Unit) that executes a given instruction (including a program as a set of instructions) and performs arithmetic operation or manipulation of the information.

The first processor 101 processes the digital image signal to be output to the monitor 106 from the information processing device 10. Specifically, the first processor 101 decompresses the image data compressed in the MPEG format to display it on the monitor 106, and outputs the decompressed data to the monitor 106 with the digital image signal.

The second processor 111 processes the analog image signal input to the information processing device 10 from the car camera 114. Specifically, the second processor 111 converts the NTSC format analog image signal input from the car camera 114 into the digital signal. The data converted into the digital signal is subjected to compression processing in a JPEG (Joint Photographic Experts Group) format.

The first processor 101 and the second processor 111 are connected so as to be bi-directionally communicable with each other through a serial communication line 121. The first processor 101 and the second processor 111 transmit and receive therebetween, for example, various commands, various signals, a program, data compressed in the JPEG format, and the like through the serial communication line 121.

The information processing device 10 includes a first non-volatile memory 102, and a second non-volatile memory 112. The first non-volatile memory 102 and the second non-volatile memory 112 each are a read only memory (ROM: Read Only Memory) that stores therein data or a program in a nonvolatile manner. Note that the first non-volatile memory 102 and the second non-volatile memory 112 each are a ROM (so-called a Flash ROM) that can rewrite data by a predetermined special command.

The information processing device 10 includes a first volatile memory 103 and a second volatile memory 113. The first volatile memory 103 and the second volatile memory 113 each are a readable and writeable random access memory (RAM: Random Access Memory) that volatizably or temporarily stores data or a program.

The first non-volatile memory 102 and the first volatile memory 103 each are a main memory device that enables direct access from the first processor 101. The second non-volatile memory 112 and the second volatile memory 113 each are a main memory device that enables direct access from the second processor 111.

The first non-volatile memory 102 stores therein a first main program. The first processor 101 reads out and executes the first main program stored in the first non-volatile memory 102. At this time, the first processor 101 expands the program read out from the first non-volatile memory 102 in an executable form, and stores it in the first volatile memory 103. The first processor 101 executes the program stored in the first volatile memory 103 while reading out it. The first processor 101 achieves the digital image signal processing as described above when executing the first main program.

The second non-volatile memory 112 stores therein a second main program. The second processor 111 reads out and executes the second main program stored in the second non-volatile memory 112. At this time, the second processor 111 expands the program read out from the second non-volatile memory 112 in an executable form, and stores it in the second volatile memory 113. The second processor 111 executes the program stored in the second volatile memory 113 while reading out it. The second processor 111 achieves the analog image signal processing as described above when executing the second main program.

Each of the first non-volatile memory 102 and the second non-volatile memory 112 has a plurality of memory surfaces. Here, each of the first non-volatile memory 102 and the second non-volatile memory 112 has two memory surfaces of a side A and a side B. Writing in and reading out can be performed on the two memory surfaces of the side A and the side B that are independent of each other.

The first main program is stored in each of the side A and the side B of the first non-volatile memory 102. The first main program stored in the side A of the first non-volatile memory 102 is referred to as a first main program A. The first main program stored in the side B of the first non-volatile memory 102 is referred to as a first main program B.

The first non-volatile memory 102 also stores therein a first start designation flag that designates which of the first main programs stored in the side A and the side B of the first non-volatile memory 102 is to be executed. At this time, the first start designation flags having the same contents may be stored in both of the side A and the side B of the first non-volatile memory 102, respectively. Alternatively, the first start designation flag may be stored in a predetermined one of the side A and the side B of the first non-volatile memory 102.

Similarly, the second main program is stored in each of a side A and a side B of the second non-volatile memory 112. The second main program stored in the side A of the second non-volatile memory 112 is referred to as a second main program, A. The second main program stored in the side B of the second non-volatile memory 112 is referred to as a second main program B.

The second non-volatile memory 112 also stores therein a second start designation flag that designates which of the second main programs stored in the side A and the side B of the second non-volatile memory 112 is to be executed. At this time, the second start designation flags having the same contents may be stored in both of the side A and the side B of the second non-volatile memory 112, respectively. Alternatively, the second start designation flag may be stored in a predetermined one of the side A and the side B of the second non-volatile memory 112.

The information processing device 10 includes a first start control unit 135. The first start control unit 135 controls the operation at the start of the first processor 101. The phrase "at the start of the first processor 101" specifically denotes when a power supply of the information processing device 10 is turned on or when the first processor 101 is reset, for example. The first start control unit 135 sets an operation mode of the first processor 101 at the start of the first processor 101. The operation mode will be described later.

The first start control unit 135 refers to the first start designation flag stored in the first non-volatile memory 102 at the start of the first processor 101. The first start control unit 135 controls so that the first processor 101 reads out and executes one of the first main program A and the first main program B that is designated by the first start designation flag, the first main program A and the first main program B being stored in the side A and the side B of the first non-volatile memory 102, respectively. Accordingly, the first processor 101 reads out and executes one first main program that is designated by the first designation flag among the first main programs stored in the side A and the side B of the first non-volatile memory 102.

Here, the first start control unit 135 is built in the first processor 101. Note that the first start control unit 135 may be provided by an exclusive circuit, or the function of the first start control unit 135 may be achieved by executing, with the first processor 101, the program stored in the first non-volatile memory 102.

Alternatively, the first start control unit 135 may be provided outside the first processor 101. In the case in which the first start control unit 135 is provided outside the first processor 101, the first start control unit 135 may be built in the second processor 111. In the case in which the first start control unit 135 is built in the second processor 111, the function of the first start control unit 135 may be achieved by executing, with the second processor 111, the program stored in the second non-volatile memory 112.

The information processing device 10 includes a second start control unit 145. The second start control unit 145 controls the operation at the start of the second processor 111. The phrase "at the start of the second processor 111" specifically denotes when a power supply of the information processing device 10 is turned on or when the second processor 111 is reset, for example. The second start control unit 145 sets an operation mode of the second processor 111 at the start of the second processor 111.

The second start control unit 145 refers to the second start designation flag stored in the second non-volatile memory 112 at the start of the second processor 111. The second start control unit 145 controls so that the second processor 111 reads out and executes one of the second main program A and the second main program B that is designated by the second start designation flag, the second main program A and the second main program B being stored in the side A and the side B of the second non-volatile memory 112, respectively. Accordingly, the second processor 111 reads out and executes one of the second main programs that is designated by the second designation flag, the second main programs being stored in the side A and the side B of the second non-volatile memory 112.

Here, the second start control unit 145 is built in the second processor 111. Note that the second start control unit 145 may be provided by an exclusive circuit, or the function of the second start control unit 145 may be achieved by executing, with the second processor 111, the program stored in the second non-volatile memory 112.

Alternatively, the second start control unit 145 may be provided outside the second processor 111. In the case in which the second start control unit 145 is provided outside the second processor 111, the second start control unit 145 may be built in the first processor 101. In the case in which the second start control unit 145 is built in the first processor 101, the function of the second start control unit 145 may be achieved by executing, with the first processor 101, the program stored in the first non-volatile memory 102.

The information processing device 10 includes a first program update unit 131. Here, the first program update unit 131 is built in the first processor 101. Note that the first program update unit 131 may be provided by an exclusive circuit, or the function of the first program update unit 131 may be achieved by executing, with the first processor 101, the program stored in the first non-volatile memory 102.

Alternatively, the first program update unit 131 may be provided outside the first processor 101. In the case in which the first program update unit 131 is provided outside the first processor 101, the first program update unit 131 may be built in the second processor 111. In the case in which the first program update unit 131 is built in the second processor 111, the function of the first program update unit 131 may be achieved by executing, with the second processor 111, the program stored in the second non-volatile memory 112.

The first program update unit 131 updates the first main program stored in the first non-volatile memory 102. Here, a first update main program for updating the first main program is acquired from outside of the information processing device 10.

The information processing device 10 is communicatably connected with a server 15 and a PC (Personal Computer) 16 through a communication network 12. The information processing device 10 includes a network controller 104. The network control 104 performs processing required to communicate with the outside through the communication network 12.

The first update main program is preliminarily stored in the server 15 or the PC 16, for example. The first processor 101 acquires the first update main program stored in the server 15 or the PC 16 using the communication network 12 as an interface, and stores it in the first volatile memory 103.

As another example, the first processor 101 may acquire the first update main program using a USB memory 109. Here, USB refers to a Universal Serial Bus. In this case, the information processing device 10 includes a USB controller 108. The USB controller 108 performs processing required for the information processing device 10 to communicate with the outside through the USB In this example, the first update main program is preliminarily stored in the USB memory 109. The USB memory 109 is connected to a USB connector 110 illustrated in FIG. 1. The first processor 101 acquires the first update main program stored in the USB memory 109 using the USB as an interface, and stores it in the first volatile memory 103.

The first program update unit 131 overwrites the first main program stored in the first non-volatile memory 102 with the first update main program temporarily stored in the first volatile memory 103 to update the first main program stored in the first non-volatile memory 102. Before this update of the main program, the first program update unit 131 refers to the first start designation flag stored in the first non-volatile memory 102. Then, the first program update unit 131 updates one of the first main program A and the first main program B that is not designated by the first start designation flag, the first main program A and the first main program B being stored in the side A and the side B of the first non-volatile memory 102, respectively.

The first program update unit 131 resets the first processor 101 after overwriting and updating the first main program stored in the first non-volatile memory 102.

The information processing device 10 includes a second program update unit 141. Here, the second program update unit 141 is built in the second processor 111. Note that the second program update unit 141 may be provided by an exclusive circuit, or the function of the second program update unit 141 may be achieved by executing, with the second processor 111, the program stored in the second non-volatile memory 112.

Alternatively, the second program update unit 141 may be provided outside the second processor 111. In the case in which the second program update unit 141 is provided outside the second processor 111, the second program update unit 141 may be built in the first processor 101. In the case in which the second program update unit 141 is built in the first processor 101, the function of the second program update unit 141 may be achieved by executing, with the second processor 111, the program stored in the first non-volatile memory 102.

The second program update unit 141 updates the second main program stored in the second non-volatile memory 112. Here, a second update main program for updating the second main program is acquired from outside of the information processing device 10.

As a method of acquiring the second update main program from outside of the information processing device 10, the second update main program copied from the external memory medium (the server 15, the PC 16, or the USB memory 109) through the communication network 12, the USB, or the like, similarly to the method of acquiring the first update main program. Suffice it to say here, however, that the second processor 111 copies the second update main program through the first processor 101 without communicating directly with the outside through the communication network 12 or the USB, for example.

In other words, the second update main program is preliminarily stored in the server 15, the PC 16, or the USB memory 109, for example. The first processor 101 acquires the second update main program stored in the server 15 or the PC 16 using the communication network 12 as an interface, and stores it in the first volatile memory 103. Alternatively, the first processor 101 acquires the second update main program stored in the USB memory 109 using the USB as an interface, and stores it in the first volatile memory 103.

The first processor 101 transmits the second update main program temporarily stored in the first volatile memory 103 to the second processor 111 through the serial communication line 121. The second processor 111 stores, in the second volatile memory 113, the second update main program received through the serial communication line 121.

The second program update unit 141 overwrites the second main program stored in the second non-volatile memory 112 with the second update main program temporarily stored in the second volatile memory 113 to update the second main program stored in the second non-volatile memory 112. Before this update of the main program, the second program update unit 141 refers to the second start designation flag stored in the second non-volatile memory 112. Then, the second program update unit 141 updates one of the second main program A and the second main program B that is not designated by the second start designation flag, the second main program A and the second main program B being stored in the side A and the side B of the second non-volatile memory 112, respectively.

The second program update unit 141 resets the second processor 111 after overwriting and updating the second main program stored in the second non-volatile memory 112.

The operations after the main programs are thus updated and the processors are reset will be further described.

The first start control unit 135 sets the operation mode of the first processor to an update confirmation mode to start the first processor when the first processor 101 is reset after the first main program stored in the first non-volatile memory 102 is updated by the first program update unit 131. At this time, the first start control unit 135 sets the first start designation flag stored in the first non-volatile memory 102 to the flag that designates one memory surface of the side A and the side B, the first main program of which has been updated by the first program update unit 131.

When being started in the update confirmation mode, the first processor 101 generates a first monitoring process that monitors whether a process generated by the execution of the first main program is normally operated. When the first monitoring process has been normally generated, the first processor 101 outputs a first monitoring process start completion signal to the second processor 111.

Then, the first processor 101 reads out and executes the first main program stored in the memory surface designated by the first start designation flag stored in the first non-volatile memory 102, i.e., the memory surface, the first main program of which has been updated.

If the process generated by the execution of the first main program has not been normally operated, the first monitoring process detects this abnormality. The first monitoring process that has detected the process abnormality issues an alarm indicating that the process abnormality has occurred, by a predetermined method. Specifically, the first processor 101 transmits a signal showing that the process abnormality has occurred from the first processor 101 to the second processor 111 or the outside of the information processing device 10, for example.

The information processing device 10 further includes a first timer 134 and a second timer 144. The second processor 111 measures time elapsed from when the first processor 101 is reset after the first main program is updated, using the second timer 144. The second processor 111 is adapted to detect that the update of the first main program has failed if the second processor 111 does not receive the first monitoring process start completion signal even after a lapse of a predetermined certain time from the reset of the first processor 101.

Similarly, the second start control unit 145 sets the operation mode of the second processor to an update confirmation mode to start the second processor when the second processor 111 is reset after the second main program stored in the second non-volatile memory 112 is updated by the second program update unit 141. At this time, the second start control unit 145 sets the second start designation flag stored in the second non-volatile memory 112 to the flag that designates one memory surface of the side A and the side B, the second main program of which has been updated by the second program update unit 141.

When the second processor 111 is started in the update confirmation mode, the second processor 111 generates a second monitoring process that monitors whether a process generated by the execution of the second main program is normally operated. When the second monitoring process has been normally generated, the second processor 111 outputs a second monitoring process start completion signal to the second processor 111.

Then, the second processor 111 reads out and executes the second main program stored in the memory surface designated by the second start designation flag stored in the second non-volatile memory 112, i.e., the memory surface, the second main program of which has been updated.

If the process generated by the execution of the second main program has not been normally operated, the second monitoring process detects this abnormality. The second monitoring process that has detected the process abnormality issues an alarm indicating that the process abnormality has occurred, by a predetermined method. Specifically, the second processor 111 transmits a signal showing that the process abnormality has occurred from the second processor 111 to the second processor 111 or the outside of the information processing device 10, for example.

The first processor 101 measures time elapsed from when the second processor 111 is reset after the second main program is updated, using the first timer 134. The first processor 101 is adapted to detect that the update of the second main program has failed if the first processor 101 does not receive the second monitoring process start completion signal even after a lapse of a predetermined certain time from the reset of the second processor 111.

The information processing device 10 thus configured includes the first non-volatile memory 102 that is a first memory storing the first main program, the first processor 101 that reads out and executes the first main program stored in the first memory, the first program update unit 131 that updates the first main program stored in the first memory, and the first start control unit 135 that starts the first processor 101 in the update confirmation mode when the first processor 101 is reset after the first main program stored in the first memory is updated by the first program update unit 131. When being started in the update confirmation mode, the first processor 101 generates the first monitoring process that monitors whether a process generated by the execution of the first main program is normally operated. When the first monitoring process has been normally generated, the first processor 101 outputs the first monitoring process start completion signal.

A program update method in the information processing device 10 thus configured is a program update method of updating the main program stored in a memory in the information processing device 10 that includes the first non-volatile memory 102 or the second non-volatile memory 112 that is a memory storing the main program, and the first processor 101 or the second processor 111 that is a processor reading out and executing the main program stored in the memory. The program update method includes: a first step of updating the main program stored in the memory; a second step of starting the processor in the update confirmation mode when the processor is reset after the main program stored in the memory is updated in the first step; and a third step of, by the processor started in the update confirmation mode, generating a monitoring process that monitors whether a process generated by the execution of the main program is normally operated, and outputting a monitoring process start completion signal when the monitoring process has been normally generated.

Since the processor has only to confirm that a monitoring process has been normally generated, the monitoring process monitoring whether the process generated by the execution of the main program is normally operated, when the processor is reset after the update of the program, time required for confirmation can be reduced as compared with a case where the processor confirms whether the whole of the program to be updated has been normally updated. Since the processor confirms that the monitoring process has been normally generated and a transmission function of a monitoring result is normal, the processor receives an abnormality report from the monitoring process if abnormality has occurred during the execution of subsequent programs, so that the processor can detect that the abnormality has occurred and cope with the abnormality.

The update confirmation mode is a mode for confirming whether the main program to be rewritten by the update has been rewritten correctly. However, if cooperation processing is executed cooperatively between the first processor 101 and the second processor 111, for example, there is the possibility that the cooperation processing is not performed correctly when the rewritten program is normally operated as it is, because only program of the one processor has been updated and the function has been changed. On the other hand, if the programs of both processors have been updated simultaneously and the update has failed, it becomes difficult to analyze what causes the update to fail.

Thus, providing the above-described configurations in the information processing device 10 and the program update method therefor enables the processors to perform a minimum function of confirming that the processors have normally generated respective processes that monitor respective processes, and one of the processors have normally transmitted the monitored result to the other processor when the processors are operated in the update confirmation mode after the programs are rewritten.

Each of the first non-volatile memory 102 and the second non-volatile memory 112 has two memory surfaces of the side A and the side B. The side A and the side B of the first non-volatile memory 102 store therein the first main program, and the side A and the side B of the second non-volatile memory 112 store therein the second main program.

Such a configuration enables one of two kinds of programs to be rewritten and updated to a new version while the other program is executed. The system is restarted after the update of the program, and the new version of the program stored in each of the first non-volatile memory 102 and the second non-volatile memory 112 is executed to thereby enable the system to be updated. At this time, the system can be restored by restarting the system using the program that has not been updated, even when some fault occurs in the new version of the program and the system cannot be normally started.

The first processor 101 outputs the first monitoring process start completion signal to the second processor 111 when the first monitoring process is normally generated in the update confirmation mode. The second processor 111 outputs the second monitoring process start completion signal to the first processor 101 when the second monitoring process is normally generated in the update confirmation mode. Therefore, there is no need to prepare exclusive hardware to confirm whether the program has been normally updated.

The elevator device provided with the information processing device 10 configured as described above includes the car camera 114 that is provided inside the elevator car 500, photographs the inside of the car 500, and outputs an analog image signal to the information processing device 10, and the monitor 106 that is provided inside the elevator car 500, and receives an input of a digital image signal from the information processing device 10 to display an image thereon. The first processor 101 of the information processing device 10 processes the digital image signal output to the monitor 106 from the information processing device 10, and the second processor 111 of the information processing device 10 processes the analog image signal input to the information processing device 10 from the car camera 114.

A digital video technology, a video compression technology, a video data storage technology, and a data transmission technology have been developed, and using these technologies, a digital video display, a monitor recorder system and a video telephone system have also been developed rapidly. The digital video display and the monitor recorder system are installed in various public facilities such as buildings and stations, provide various pieces of information, and perform monitoring for an emergency. The video telephone system can provide a sense of ease to a user of the elevator by having a conversation with a person in charge in a monitoring center through a video when the user is confined in the elevator, for example, and the person in charge in the monitor center can confirm conditions inside the elevator. Particularly, since an internal space of the elevator is a closed space, in addition to the video telephone system, the digital video display and the monitor recorder system are sometimes required, the digital video display providing the information to the user of the elevator, and the monitor recorder system performing monitoring of the user.

To provide the digital video display, the monitor recorder and the video telephone system, there is a method of executing the programs equivalent to digital video processing and video compression processing by a general-purpose processor. However, when the general-purpose processor performs the digital video processing and the video compression processing in the trend of high resolution of the video and high compression of the video data, there is a possible problem in that temperature of the general-purpose processor is increased. Since the temperature increase of the general-purpose processor may cause an operation failure due to thermal runaway, the temperature needs to be lowered by a cooling device such as a fan. If the general-purpose processor exhibits the thermal runaway due to the failure of the fan, periodic maintenance is required, thereby causing the cost increase.

According to the elevator device provided with the information processing device 10 as described above, the digital image signal processing output to the monitor 106 and the analog image signal processing input from the car camera 114 can be performed by respective exclusive processors. Furthermore, each of the plurality of exclusive processors can reduce time required for confirmation processing after the update of the program.

Note that FIG. 2 illustrates a monitoring camera 11 connected to the communication network 12. The monitoring camera 11 transmits a photographed video as, for example, compressed video data compressed in the MPEG format to the information processing device 10. Alternatively, the first processor 101 expands the compressed video data received from the monitoring camera 11 by the information processing device 10 to display it on the monitor 106. The first processor 101 stores, in HDD (Hard Disk Drive) 105, the compressed video data received from the monitoring camera 11 by the information processing device 10. The first processor 101 can also read out and expand the compressed video data stored in the HDD 105 to display it on the monitor 106.

A start processing flow and a program update processing flow in the information processing device 10 configured as described above will be described in more detail, including various kinds of flag control and an exchange of various signals. In the above explanation, the processing using the first start designation flag and the second start designation flag has already been described. Hereinafter, the processing using a first start confirmation flag and a second start confirmation flag, and a first update flag and a second update flag will be described.

The first start confirmation flag and the first update flag are stored in the first non-volatile memory 102. The second start confirmation flag and the second update flag are stored in the second non-volatile memory 112.

The first start confirmation flag is a flag indicating whether it has been confirmed that first main program has been started correctly. Here, the first start confirmation flag is present in each of the first main program A and the first main program B. The second start confirmation flag is a flag indicating whether it has been confirmed that second main program has been started correctly. Here, the second start confirmation flag is present in each of the second main program A and the second main program B.

Here, the start confirmation flag being invalid means that although the start of the main program is attempted, the start of the main program cannot be confirmed because processing of determining the start confirmation is not performed. That is, it can be determined that the update of the main program has failed due to some cause. The start confirmation flag may become invalid when there have arisen problems in that part of the main program cannot be read out correctly or part of the main program has changed due to physical fault of the non-volatile memory.

The first update flag is a flag indicating whether the first main program stored in the first non-volatile memory 102 has been overwritten with the first update main program by the first program update unit 131. The second update flag is a flag indicating whether the second main program stored in the second non-volatile memory 112 has been overwritten with the second update main program by the second program update unit 141.

Although described later, signals exchanged between the first processor 101 and the second processor 111 include a first reset control signal and a second reset control signal, a first update confirmation flag signal and a second update confirmation flag signal, and a start inversion flag signal as illustrated in FIG. 2.

The first reset control signal and the second reset control signal, and the first update confirmation flag signal and the second update confirmation flag signal are exchanged through the serial communication line 121. The first reset control signal is a signal that is transmitted from the first processor 101 to reset the second processor 111. The second reset control signal is a signal that is transmitted from the second processor 111 to reset the first processor 101.

The first update confirmation flag signal is a signal for instructing the second processor 111 to start in the update confirmation mode by the first processor 101. The second update confirmation flag signal is a signal for instructing the first processor 101 to start in the update confirmation mode by the second processor 111.

The start inversion flag signal has an open-drain configuration. The start inversion flag signal is pulled up to a power supply voltage (VDD) by the resistance. The start inversion flag signal is normally in a condition of being input to both of the first processor 101 and the second processor 111. That is, the first processor 101 and the second processor 111 detect a voltage (high level) equal to the power supply voltage at a normal time.

If the first processor 101 cannot be started with one main program of the first main program A and the first main program B that is designated by the first start designation flag, the first main program A and the first main program B being stored in the first non-volatile memory 102, the first processor 101 drives the start inversion flag signal to a ground level (low level).

The second processor 111 can detect that the first processor 101 cannot be started with the main program designated by the first start designation flag when detecting that the start inversion flag signal has become the low level. In this case, the first processor 101 is started with the main program not designated by the first start designation flag. Therefore, the second processor 111 can recognize that the first processor 101 has been started with the main program not designated by the first start designation flag.

Similarly, if the second processor 111 cannot be started with one main program of the second main program A and the second main program B that is designated by the second start designation flag, the first main program A and the first main program B being stored in the second non-volatile memory 112, the second processor 111 drives the start inversion flag signal to a ground level (low level).

The first processor 101 can detect that the second processor 111 cannot be started with the main program designated by the second start designation flag when detecting that the start inversion flag signal has become the low level. In this case, the second processor 111 is started with the main program not designated by the second start designation flag. Therefore, the first processor 101 can recognize that the second processor 111 has been started with the main program not designated by the second start designation flag.

A flow of the start processing of the information processing device 10 will be described with reference to FIG. 3 and FIG. 4 based on the above-described functions of each flag and each signal. When the power supply of the information processing device 10 is turned on in step S200, the first processor 101 and the second processor 111 are reset-released by a reset circuit formed of hardware (steps S201 and S301) after the lapse of a predetermined time from when the power supply is turned on.

A flow of the processing in the first processor 101 will be described. The first processor 101 reads out and executes a start program from the first non-volatile memory 102 to achieve the function of the first start control unit 135. That is, the processing by the first start control unit 135 means the same processing as the processing by the first processor 101 that is executing the start program.

After step S201, the process proceeds to step S202. In step S202, the first start control unit 135 performs initialization processing of the first processor 101. Specifically, the initialization processing of the first processor 101 includes clock setting required for operation of the first processor 101, cache setting, setting of access parameters in the first non-volatile memory 102, initialization of the first volatile memory 103, setting of a controller required for communication through the serial communication line 121, and setting of an input-output port of the first processor 101.

In subsequent step S203, the first start control unit 135 refers to the first update flag stored in the first non-volatile memory 102, and confirms whether the first main program has been updated by the first program update unit 131. In step S203, if the first main program is not updated because the first update flag is invalid, the process proceeds to step S204. On the other hand, when the first update flag is valid and it is immediately after the first main program is updated, the process proceeds to step S205.

In step S204, the first start control unit 135 confirms whether the first start confirmation flag of the first main program designated by the first start designation flag is valid.

Specific conditions of the first start confirmation flag will be described with reference to FIGS. 5(A), 5(B), and 5(C). As described above, the first start confirmation flag is a flag indicating whether it has been confirmed that the first main program has been started correctly. Thus, in a steady-state condition illustrated in FIG. 5(A), both start confirmation flags of the first main program A and the first main program B are valid.

Immediately after the first main program A is updated by the first program update unit 131, it has not been confirmed yet whether the first main program A has been started correctly. Thus, as illustrated in FIG. 5(B), the start confirmation flag of the first main program A is invalid and the start confirmation flag of the first main program B is valid.

Immediately after the first main program B is updated by the first program update unit 131, it has not been confirmed yet whether the first main program B has been started correctly. Thus, as illustrated in FIG. 5(C), the start confirmation flag of the first main program A is valid and the start confirmation flag of the first main program B is invalid.

Note that a condition where both start confirmation flags of the first main program A and the first main program B become invalid does not occur in principle. However, if such a condition has occurred, it means that there is no first main program that has been started correctly, and therefore the first start control unit 135 detects a fault.

The description is continued returning to FIG. 3. In step S204, when the start confirmation flag of the main program designated by the first start designation flag is valid, the process proceeds to step S205. On the other hand, when the start confirmation flag of the main program designated by the first start designation flag is invalid, the process proceeds to step S206.

In step S205, the first start control unit 135 confirms whether the start inversion flag signal is at high level. If the start inversion flag signal is at high level, it can be determined that there is no problem even if the second processor 111 executes the second main program designated by the second start designation flag. In this case, the process proceeds from step S205 to step S207. On the other hand, if the start inversion flag signal is at low level, it can be determined that a problem occurs if the second processor 111 executes the second main program designated by the second start designation flag. In this case, the process proceeds from step S205 to step S209.

In step S206, the first start control unit 135 sets the start inversion flag signal to low level.

In step S207, the first start control unit 135 confirms whether the second update confirmation flag signal transmitted from the second processor 111 is invalid. If the second update confirmation flag signal is invalid, the process proceeds to step S208. On the other hand, if the second update confirmation flag signal is valid, it means that the second processor 111 instructs the first processor 101 to start in the update confirmation mode. In this case, the process proceeds to step S209.

In step S208, the first start control unit 135 selects the first main program designated by the first start designation flag. After step S208, the process proceeds to step S210.

In step S209, the first start control unit 135 selects the first main program not designated by the first start designation flag. After step S209, the process proceeds to step S210.

In step S210, the first start control unit 135 stores, in the first volatile memory 103, a result of which of the first main program A and the first main program B is selected in step S208 or step S209. After step S210, the process reaches "C" in FIG. 3. Then, the process starts from "C" in FIG. 4, and proceeds to step S211.

In step S211, the first start control unit 135 confirms whether the second update confirmation flag signal is invalid. If the second update confirmation flag signal is invalid, the process proceeds to step S212. In step S212, the first start control unit 135 sets the first update flag to invalid, and the process proceeds to step S213. In step S213, the first processor 101 starts the execution of the first main program stored in the first volatile memory 103 in step S210 in a condition where the update confirmation mode is invalid.

On the other hand, if the second update confirmation flag signal is valid in step S211, the process proceeds to step S214. In step S214, the first processor 101 starts the execution of the first main program stored in the first volatile memory 103 in step S210 in a condition where the update confirmation mode is valid.

In step S215, the first processor 101 executes the first main program in the condition where the update confirmation mode is invalid. In subsequent step S216, the first processor 101 exchanges a start completion notification with the second processor 111 (a dotted line indicated by 290 represents this exchange).

After the first processor 101 transmits the start completion notification in step S216, it can be determined that the first main program has been started normally. Thus, after step S216, the process proceeds to step S217, and the first processor 101 sets the first start confirmation flag of the first main program stored in the first volatile memory 103 in step S210 to valid. After step S217, the process proceeds to step S218.

In step S218, the first processor 101 confirms whether the first main program designated by the first start designation flag is the same as the first main program (selection result) stored in the first volatile memory 103 in step S210. If the first main program designated by the first start designation flag is the same as the first main program stored in the first volatile memory 103 in step S210, the process proceeds to step S219.

In step S219, the first processor 101 executes the first main program, and performs the normal operation based on the first main program. In the normal operation of the first main program, all functions installed in the first main program operate. Thus, the first processor 101 and the second processor 111 perform mutual exchange continuously (a dotted line indicated by 291 represents this exchange).

On the other hand, in step S218, if the first main program designated by the first start designation flag is not the same as the first main program stored in the first volatile memory 103 in step S210, the process proceeds to step S220.

In step S220, the first start designation flag stored in the first non-volatile memory 102 is changed to the flag that instructs the first main program stored in the first volatile memory 103 in step S210. It is recorded that the first start designation flag has been changed as a log. This log is recorded in the first non-volatile memory 102, the HDD 105, and storage devices such as the server 15 and the PC 16 that are connected through the communication network 12. After step S220, the process proceeds to step S219.

On the other hand, after step S214, the process proceeds to step S221. In step S221, the first processor 101 executes the first main program in the condition where the update confirmation mode is valid. If there is no problem in the operation in the update confirmation mode, the first processor 101 changes the first start confirmation flag to invalid to confirm the operation of all functions of the first main program when the first processor 101 is restarted next time. The processing in step S221 will be described in detail in the description of the program update processing described later.

A flow of the processing in the second processor 111 is the same as the flow of the processing in the first processor 101. That is, steps S301 to S321 performed in the second processor 111 are the same processes as steps S201 to S221 performed in the first processor 101, respectively. More precisely, in the contents described about steps S201 to S221 above, matters relating to the first processor 101 are replaced with corresponding matters relating to the second processor 111, and matters relating to the second processor 111 are replaced with corresponding matters relating to the first processor 101, to thereby have the contents in steps S301 to S321. Therefore, the detailed descriptions of steps S301 to S321 performed in the second processor 111 are omitted.

Note that FIGS. 6(A), 6(B), and 6(C) illustrate specific conditions of the second start confirmation flag, respectively. The conditions of the second start confirmation flag in FIGS. 6(A), 6(B), and 6(C) correspond to the conditions of the first start confirmation flag in FIGS. 5(A), 5(B), and 5(C), respectively. That is, in a steady-state condition illustrated in FIG. 6(A), both start confirmation flags of the second main program A and the second main program B are valid. Immediately after the second main program A is updated by the second program update unit 141, the start confirmation flag of the second main program A is invalid, and the start confirmation flag of the second main program B is valid, as illustrated in FIG. 6(B). Immediately after the second main program B is updated by the second program update unit 141, the start confirmation flag of the second main program A is valid and the start confirmation flag of the second main program B is invalid, as illustrated in FIG. 6(C).

Figure 7:
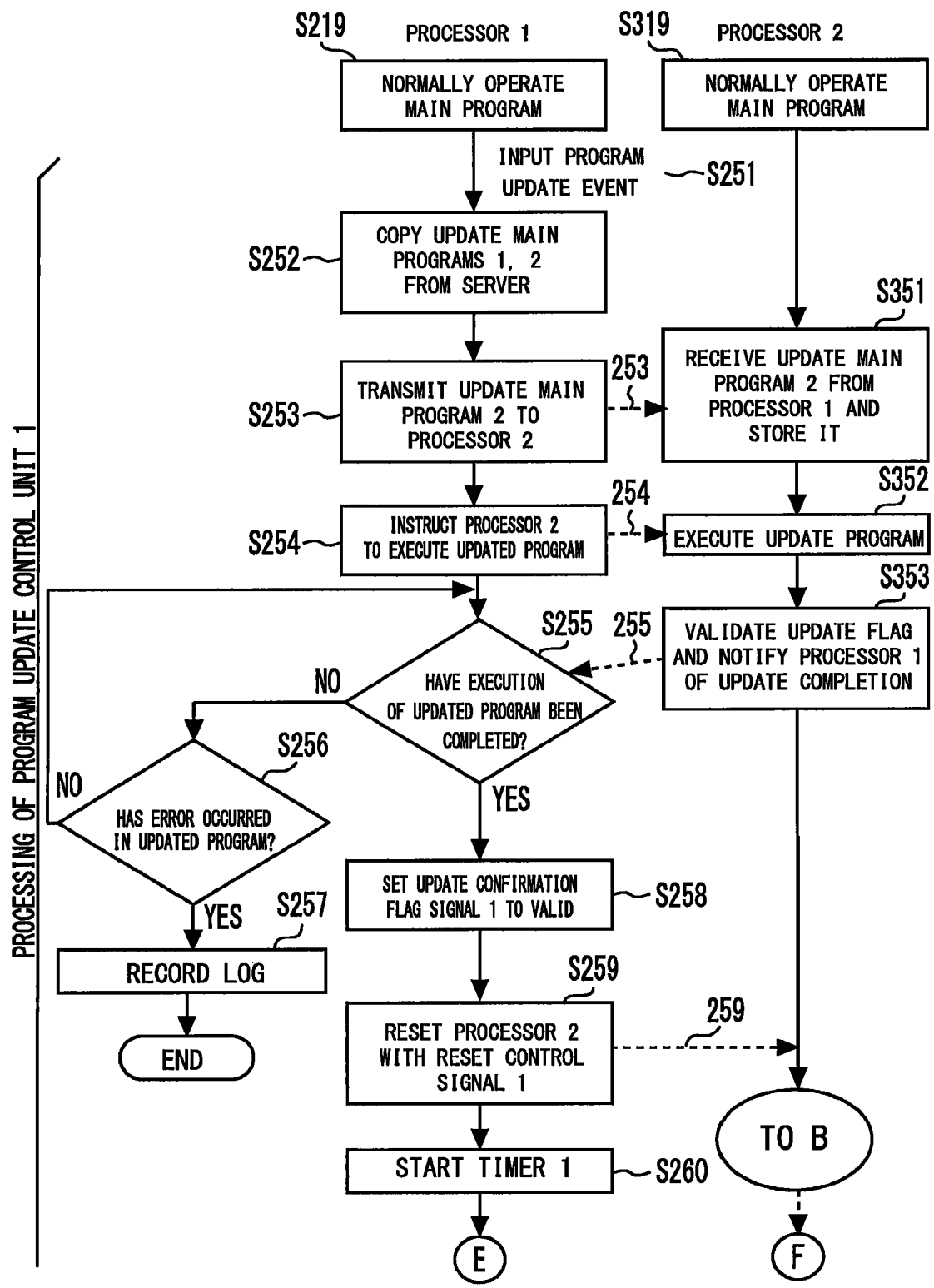
FIG. 7 is a flowchart illustrating program update processing of the information processing device according to Embodiment 1 of the present invention.

A flow of the program update processing of the information processing device 10 will be described with reference to FIG. 7 to FIG. 10. Step S219 illustrated in FIG. 7 is the same process as step S219 illustrated in FIG. 4. Step S219 represents a condition where the first processor 101 executes the first main program and the first main program is normally operated. Similarly, step S319 illustrated in FIG. 7 is the same process as step S319 in illustrated in FIG. 4. Step S319 represents a condition where the second processor 111 executes the second main program and the second main program is normally operated.

In this condition, a program update event is input to the first processor 101 in step S251. The program update event may be input from the server 15 or the PC 16 through the communication network 12, or may be input by a user's command.

When the program update event is input in step S251, the first program update unit 131 acquires the first update main program 1 and the second update main program 2 from, for example, the server 15 through the communication network 12 and the network controller 104, and stores the acquired first update main program 1 and second update main program 2 in the first volatile memory 103 in step S252.

In subsequent step S253, the first program update unit 131 transmits the second update main program stored in the first volatile memory 103 to the second processor 111. The serial communication line 121 is used for this transmission. This transmission is indicated by a dotted line 253.

The second processor 111 receives the second update main program from the first processor 101 through the serial communication line 121 in step S351. The second processor 111 stores the received second update main program in the second volatile memory 113.

The first update main program is stored in the first volatile memory 103 connected to the first processor 101 when the processes in steps S253 and S351 have been completed. The second update program is also stored in the second volatile memory 113 connected in the second processor 111.

In step S254, the first program update unit 131 provides, to the second processor 111, an execution instruction of the update program. The "update program" refers to the update of the second main program by the second program update unit 141. This execution instruction is indicated by a dotted line 254. The second processor 111 receives the execution instruction of the update program, and executes the update program in step S352. That is, the second main program is updated by the second program update unit 141.

In step S352, the second program update unit 141 refers to the second start designation flag stored in the second non-volatile memory 112, and overwrites the one second main program of the second main program A and the second main program B that is not designated by the second start designation flag with the second update main program stored in the second volatile memory 113. The process proceeds to step S353, and the second update flag is set to valid to record that the second update main program has been written. The second program update unit 141 notifies the first processor 101 that the update has been completed. This notification is indicated by a dotted line 255.

The first program update unit 131 of the first processor 101 provides the execution instruction of the update program in step S254, and then confirms that the execution of the update program has been completed in step S255. If the execution of the update program is not completed, the process proceeds to step S256.

In step S256, the first program update unit 131 confirms whether an error has occurred in the execution of the update program by the second processor 111, i.e., in the second main program update processing by the second program update unit 141. If the error has occurred, it is notified in the process of step S352 of the second processor 111. If the error has occurred, the process proceeds to step S257, the log is recorded, and the process ends. On the other hand, if the error does not occur in step S256, returning to step S255, the first program update unit 131 waits for the second processor 111 to complete the update of the program.

When the execution of the update program has been completed in step S255, the process proceeds to step S258. In step S258, the first program update unit 131 sets the first update confirmation flag signal to valid to confirm, in the update confirmation mode, whether the program updated by the second processor 111 has been written correctly. In subsequent step S259, the first program update unit 131 transmits the first reset control signal to the second processor 111, and resets the second processor 111. The reset process at this time is indicated by a dotted line 259.

After step S259, the process proceeds to step S260. In step S260, the first program update unit 131 sets the first timer 134 to a predetermined positive initial value. The first program update unit 131 starts subtraction from the initial value of the first timer 134.

On the other hand, after step S353, the second processor 111 is reset by the first reset control signal received from the first processor 101, and starts the process from "B" in FIG. 3. The processing of the second processor 111 after this reset will be described with reference to FIG. 3 and FIG. 4.

The second processor 111 after the reset executes the initialization processing in step S302, and then confirms the second update flag in step S303. Since the second update flag is set to valid in step S353 in FIG. 7, the process proceeds to step S305. Since the start inversion flag signal remains at high level in step S305, the process proceeds to step S307.

In step S307, the first update confirmation flag signal is confirmed. Since the first update confirmation flag signal is set to valid in step S258 in FIG. 7, the process proceeds to step S309. In step S309, the second main program not designated by the second start command flag is selected. That is, the second main program overwritten with the second update main program in step S352 is selected.

In subsequent step S310, the selection result in step S309 is stored in the second volatile memory 113. The process proceeds to step S311, and a first update confirmation flag signal 133 is confirmed. Since the first update confirmation flag signal is set to valid in the same way as step S307, the process proceeds to step S314. In step S314, the second main program is started in a condition where the update confirmation mode is valid. In step S321, the start of the second main program is completed in the update confirmation mode, and the second start confirmation flag selected in step S309 is set to invalid.

Step S321 illustrated in FIG. 8 corresponds to step S321 in FIG. 4. When the start of the second main program is completed in the update confirmation mode in step S321, the second monitoring process start completion signal is transmitted from the second processor 111 to the first processor 101 through the serial communication line 121 (dotted line 261).

In step S261, the first program update unit 131 confirms whether the first program update unit 131 has received the second monitoring process start completion signal from the second processor 111. If the first program update unit 131 does not receive the second monitoring process start completion signal, the process proceeds to step S262. In step S262, the first program update unit 131 confirms whether the first timer 134 started in step S260 has become zero. If the first timer 134 does not become zero, the process is returned to step S261.

On the other hand, if the first timer 134 becomes zero, the process proceeds to step S263. In step S263, it can be determined that the update of the program has failed because there is some problem in starting the second main program in the update confirmation mode in step S321. Then, the first program update unit 131 records the log.

In subsequent step S264, the first program update unit 131 sets the first update confirmation flag signal 133 to invalid. Then, the process proceeds to step S265, and the first program update unit 131 transmits the first reset control signal to the second processor 111 to reset the second processor 111. In subsequent step S266, the first program update unit 131 resets the first processor 101. Thus, the first processor 101 and the second processor 111 start the start processing from "A" and "B" in FIG. 3, respectively.

At this time, the condition of the second update flag is changed from invalid to valid in step S353 in FIG. 7, but the flags other than the second update flag are in the same conditions as before the first program update unit 131 executes the processing. Thus, when the processing of the second processor 111 is executed as illustrated in FIG. 3 and FIG. 4, the update flag becomes invalid in step S312, and the condition of the update flag is returned to the same condition as before the first program update unit 131 executes the processing.

On the other hand, if the second monitoring process start completion signal has been received in step S261, the process proceeds to step S267. In step S267, the first program update unit 131 sets the first update confirmation flag signal 133 to invalid. In subsequent step S268, the first program update unit 131 notifies the second processor 111 that the processing has been completed. This notification is indicated by a dotted line 268. The process reaches "G." Then, the process starts from "G" in FIG. 9, and proceeds to step S271.

Figure 9:
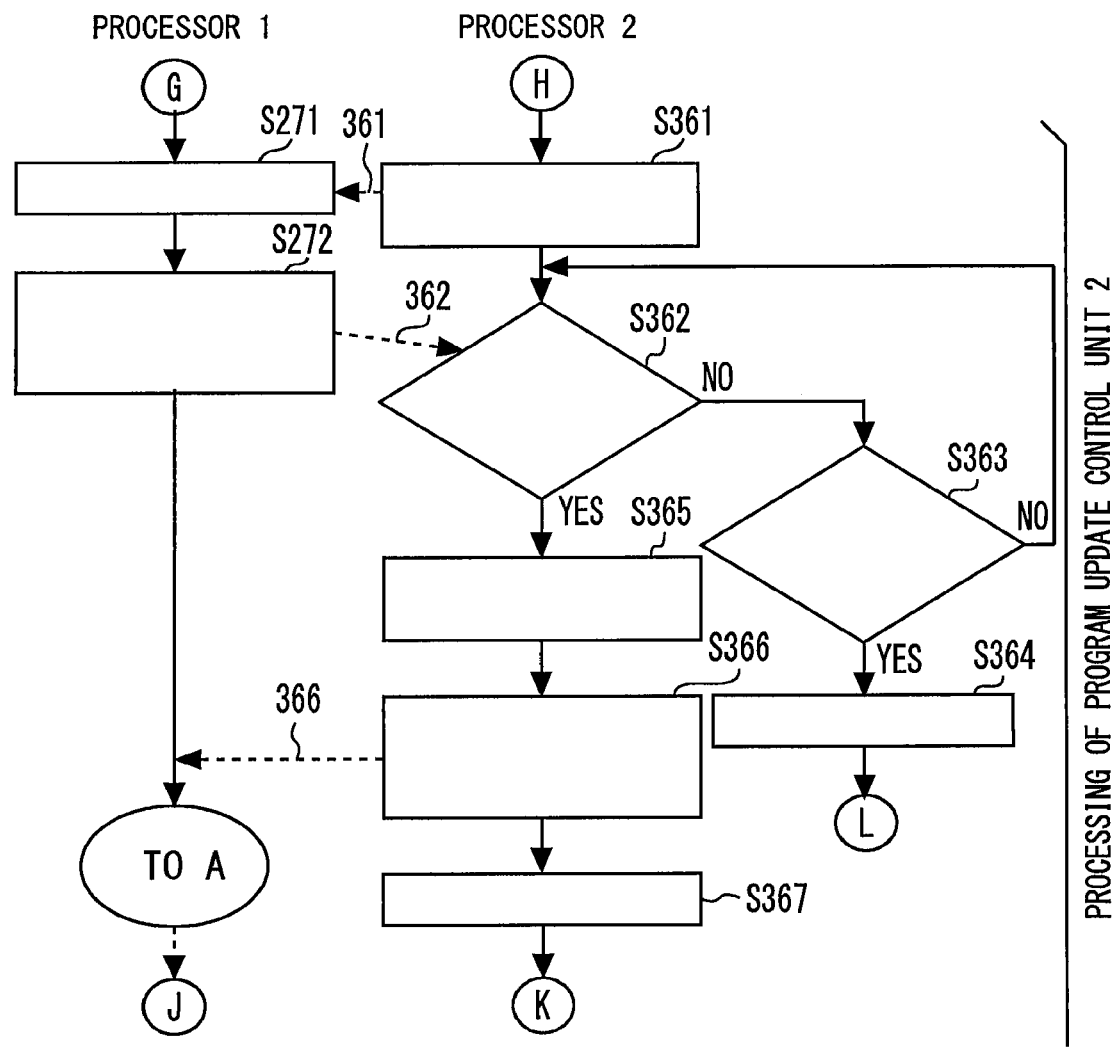
FIG. 9 is a flowchart illustrating program update processing of the information processing device according to Embodiment 1 of the present invention.

The second processor 111, after step S321, receives, from the first program update unit 131, the notification that the processing has been completed in step S354, and the process reaches "H." The process starts from "H" in FIG. 9, and proceeds to step S361.

In the processing illustrated in FIG. 9 and FIG. 10 after each process of steps S271 and S361, the second program update unit 141 of the second processor 111 performs the program update control of the first processor 101.

The first processor 101 performs the processes in steps S271 and S272 illustrated in FIG. 9 that are the same as the processes in steps S352 and S353 performed by the second processor 111 in FIG. 7, respectively. The second program update unit 141 performs the processes in steps S361 to S367 illustrated in FIG. 9 that are the same as the processes in steps S254 to S260 performed by the first program update unit 131 in FIG. 7, respectively. However, the processes after step S364 are different from the processes illustrated in FIG. 7 and FIG. 8 in that the process reaches "L," and then the process starts "L" in FIG. 10 and proceeds to step S374.

The first processor 101 performs the process in step S221 illustrated in FIG. 10 that is the same as the process in step S321 performed by the second processor 111 in FIG. 8. The second program update unit 141 performs the processes in steps S368 to S370, and S373 to S375 illustrated in FIG. 10 that are the same as the processes in step S261 to S266 performed by the first program update unit 131 in FIG. 8, respectively.

Note that in the flow illustrated in FIG. 10, if the second program update unit 141 has received the first monitoring process start completion signal in step S368, the process proceeds to step S371. In step S371, the second program update unit 141 provides a start designation flag update instruction to the first processor 101. The process proceeds to step S372, and the second program update unit 141 updates the second start designation flag stored in the second non-volatile memory 112 to designate the updated second main program. After step S372, the process proceeds to step S373.

On the other hand, in the first processor 101 that has received the start designation flag update instruction transmitted in step S371, the process proceeds from step S221 to S273. In step S273, the first processor 101 updates the first start designation flag stored in the first non-volatile memory 102 to designate the updated first main program. This signal exchange is indicated by a dotted line 371.

After the process in step S273 is completed, the first processor 101 receives the second reset control signal transmitted from the second program update unit 141 in step S374, and is reset. The process reaches "A" in FIG. 10, and starts from "A" in FIG. 3 to execute the processing after the reset. In the second processor 111 reset in step S375, the process reaches "B" in FIG. 10, and starts from "B" in FIG. 3 to execute the processing after the reset.

The processing after the reset of each of the first processor 101 and the second processor 111 will be simply described with reference to FIG. 3 and FIG. 4. The first processor 101 and the second processor 111 each are reset-released (steps S201, S301), and then perform the initialization processing (steps S202, S302). Since the first update flag and the second update flag are valid, the processes proceed from steps S203, S303 to steps S205, S305, respectively.

Since the start inversion flag signal is at high level, the processes proceed to steps S207, S307, respectively. Since both of the first update confirmation flag signal and the second update confirmation flag signal are invalid herein, the processes proceed to steps S208, S308, respectively, and each of the first processor 101 and the second processor 111 selects the main program designated by the start designation flag.

The start designation flags are moved to the updated main programs by the processes in steps S273, S372 in FIG. 10, respectively. Thus, the main programs selected in steps S208, S308 become the updated main programs.

It is determined that the update confirmation flag signals are invalid in steps S211, S311, respectively, and the processes proceed to steps S212, S312 to invalidate the first and second update flags, respectively. In subsequent steps S213, S313, the respective update confirmation modes are invalidated to start the first and second main programs. In steps S215, S315, the first and second main programs are executed, respectively, in a condition where the update confirmation mode is invalid, and the start completion notifications are mutually exchanged in steps S216, S316.

In subsequent steps S217, S317, the first and second start confirmation flags are changed to valid, respectively. In steps S218, S318, the first and second start designation flags are the same as the selection results in steps S208, S308, respectively, and therefore the processes proceed to steps S219, S319 to perform the normal operations of the first and second main programs, respectively.

The flows of processing described above enable the first processor 101 to surely update the first main program that is not used currently of the first main program A and the first main program B that are different in version, and enable the second processor 111 to surely update the second main program that is not used currently of the second program A and the second main program B that are different in version. That is, the first and second main programs are operated once in a condition where the update confirmation mode is valid to confirm that the respective first and second main programs are normally operated, and the respective main programs used after the reset are switched to the updated main programs, thereby capable of surely updating the programs.

In the information processing device 10 configured as described above, the operations when a fault has occurred during the normal operation of the main program will be described.

When in step S219 and step S319 in the flowchart of FIG. 4, the first processor 101 and the second processor 111 execute the first and second main programs, and the first and second main programs are normally operated, respectively, the first processor 101 and the second processor 111 periodically confirm the condition of each other to confirm whether the execution of the main program stops, or whether an error has occurred (indicated by a dotted line 291).

An operation example when the second processor 111 does not respond to the first processor 101 in a condition where the periodic condition confirmation is performed will be described with reference to FIG. 11.

In FIG. 11, the first processor 101 and the second processor 111 execute the normal operations of the first and second main programs (steps S219, S319), respectively. At this time, the first processor 101 provides the condition notification to the second processor 111 (indicated by a dotted line 292), but the second processor 111 does not provide the condition notification to the first processor 101 (indicated by a dotted line 293).

The first processor 101 detects that the condition notification 293 from the second processor 111 has stopped, in a process generated by executing the first main program, for example, a condition monitoring process. When the first processor 101 detects that the condition notification 293 from the second processor 111 has stopped, the process in the first processor 101 proceeds to step S401. In step S401, the first processor 101 invalidates the first start confirmation flag stored in the first non-volatile memory 102. In subsequent step S402, the first processor 101 transmits the first reset control signal to the second processor 111 to reset the second processor 111 (the reset control is indicated by a dotted line 402).

The process proceeds to step S403, and the first processor 101 resets the first processor 101 itself. After the first processor 101 is reset, the process reaches "A" in FIG. 11, starts from "A" in FIG. 3, and proceeds to step S201. On the other hand, the second processor 111 that has received the first reset control signal is reset, and the process reaches "B" in FIG. 11, starts from "B" in FIG. 3, and proceeds to step S301.

The processing of the first processor 101 and the second processor 111 after the reset is performed in accordance with the above-described flowcharts in FIG. 3 and FIG. 4. Since the first start confirmation flag is invalidated in step S401 in FIG. 11, here the process proceeds from step S204 to step S206 in FIG. 3. In step S206, the start inversion flag signal is set to low level. Accordingly, in this case, the process proceeds to step S209 to select the first main program not designated by the first start designation flag.

On the other hand, the second start confirmation flag stored in the second non-volatile memory 112 remains valid. Thus, in the second processor 111, the process proceeds from step S304 to step S305. In step S305, the start inversion flag signal is at low level, and the process proceeds to step S309 to select the second main program not designated by the second start designation flag also in the second processor 111.

Then, the processes proceed to steps S215, S315, and the first processor 101 and the second processor 111 invalidate the update confirmation mode to select and start the main programs selected in steps S209, S309, i.e., the main programs different from the start designation flags, respectively.

Accordingly, the first processor 101 and the second processor 111 each select and start the main program that is different from the main program executed in steps S219, S319 in FIG. 11 of the main programs stored in the side A and the side B. Note that if the abnormality has occurred in the second processor 111 after the update of the program, the main programs that are different from the main programs executed in steps S219, S319 in FIG. 11 mean the main programs that have been operated without occurring the abnormality before the update of the programs.

Then, the processes proceed from steps S218, S318 to steps S220, S320, respectively, to change the first and second start designation flags and record the logs. Thus, the main programs that are normally operated in steps S219, S319 finally mean the main programs that have been normally operated without the abnormality occurring before the update of the programs. That is, the main programs are restored at least to the condition before the update, thereby capable of continuously operating without stopping the information processing device 10.

Embodiment 2

Figure 12:
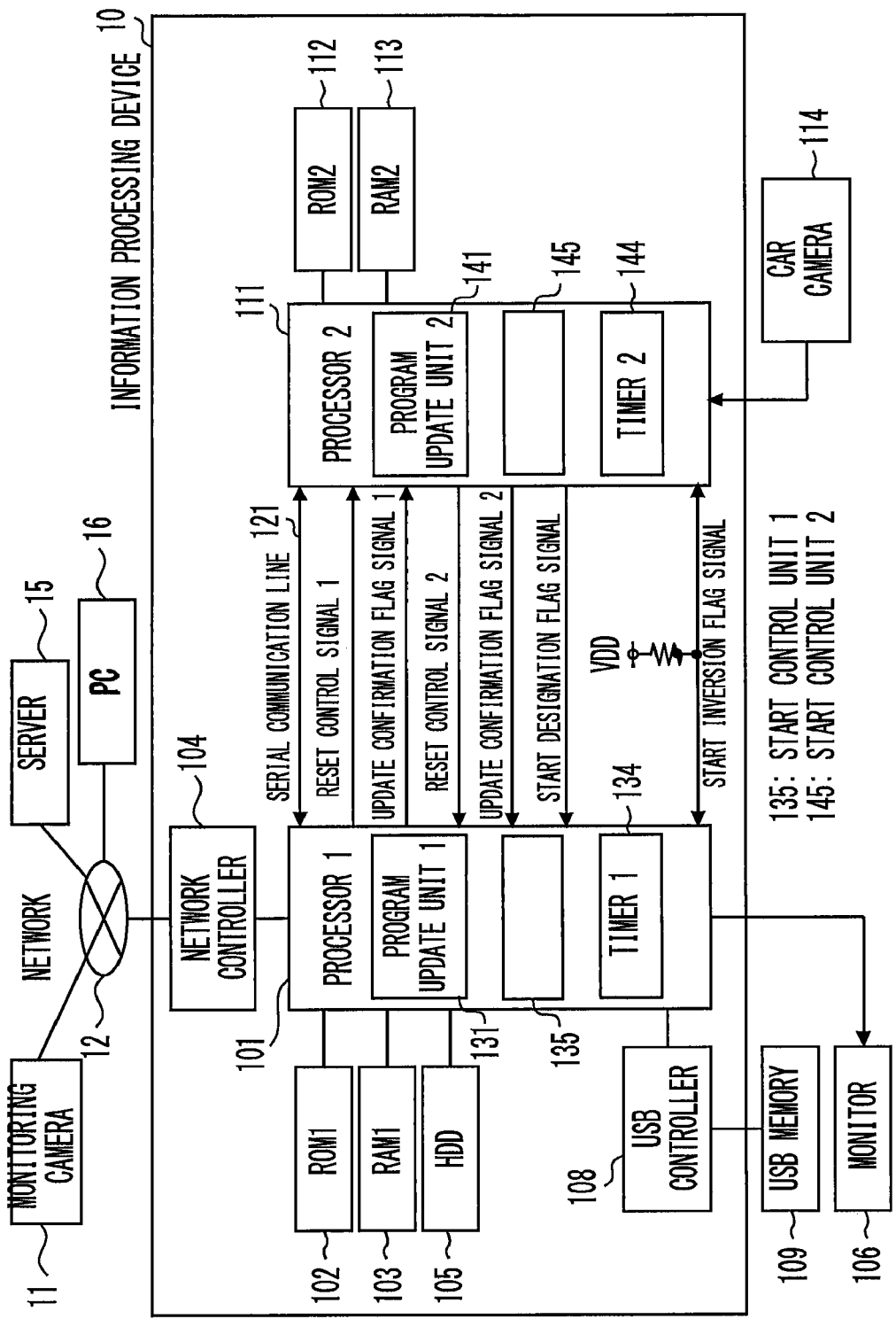
FIG. 12 is a block diagram illustrating a configuration of an information processing device according to Embodiment 2 of the present invention.
Figure 13:
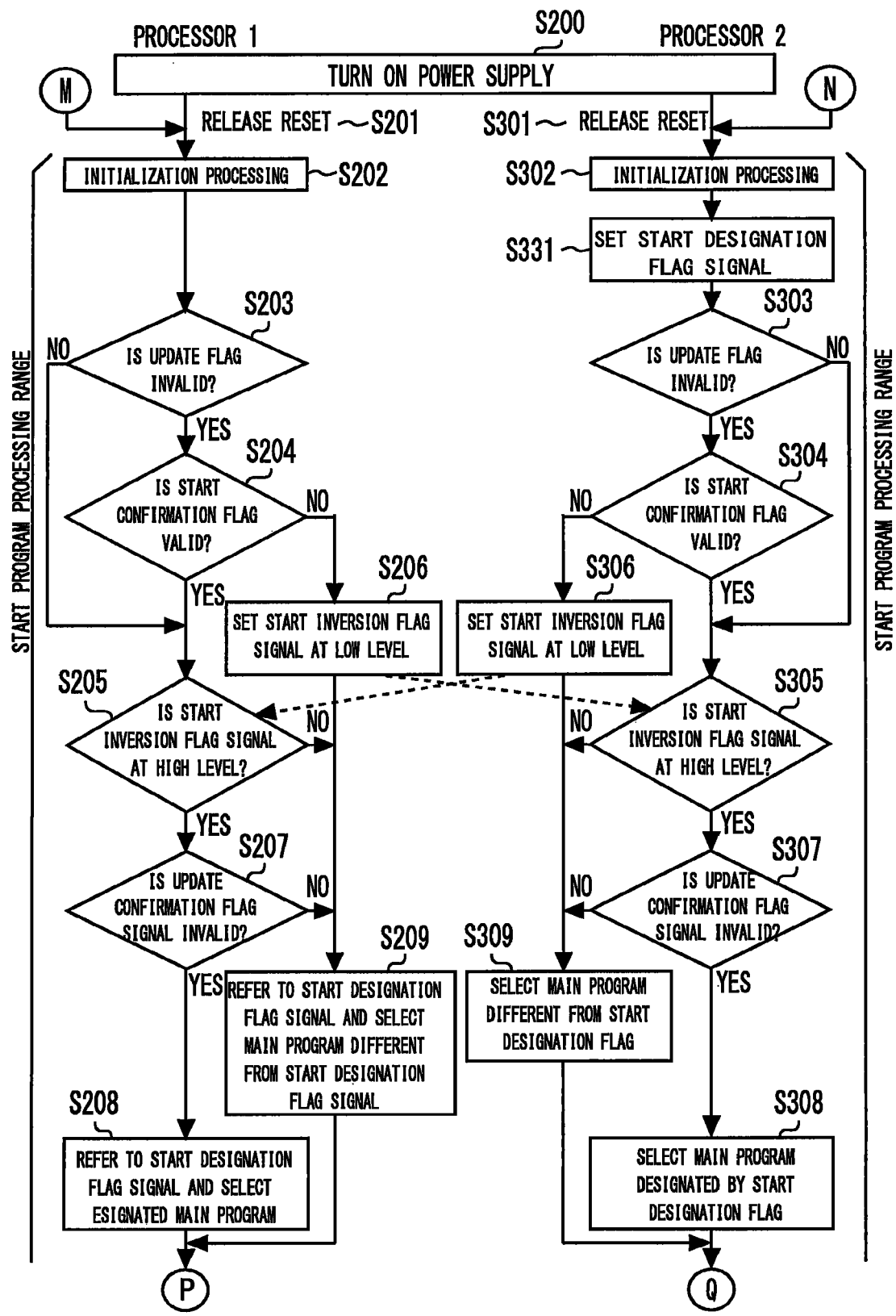
FIG. 13 is a flowchart illustrating start processing of the information processing device according to Embodiment 2 of the present invention.
Figure 14:
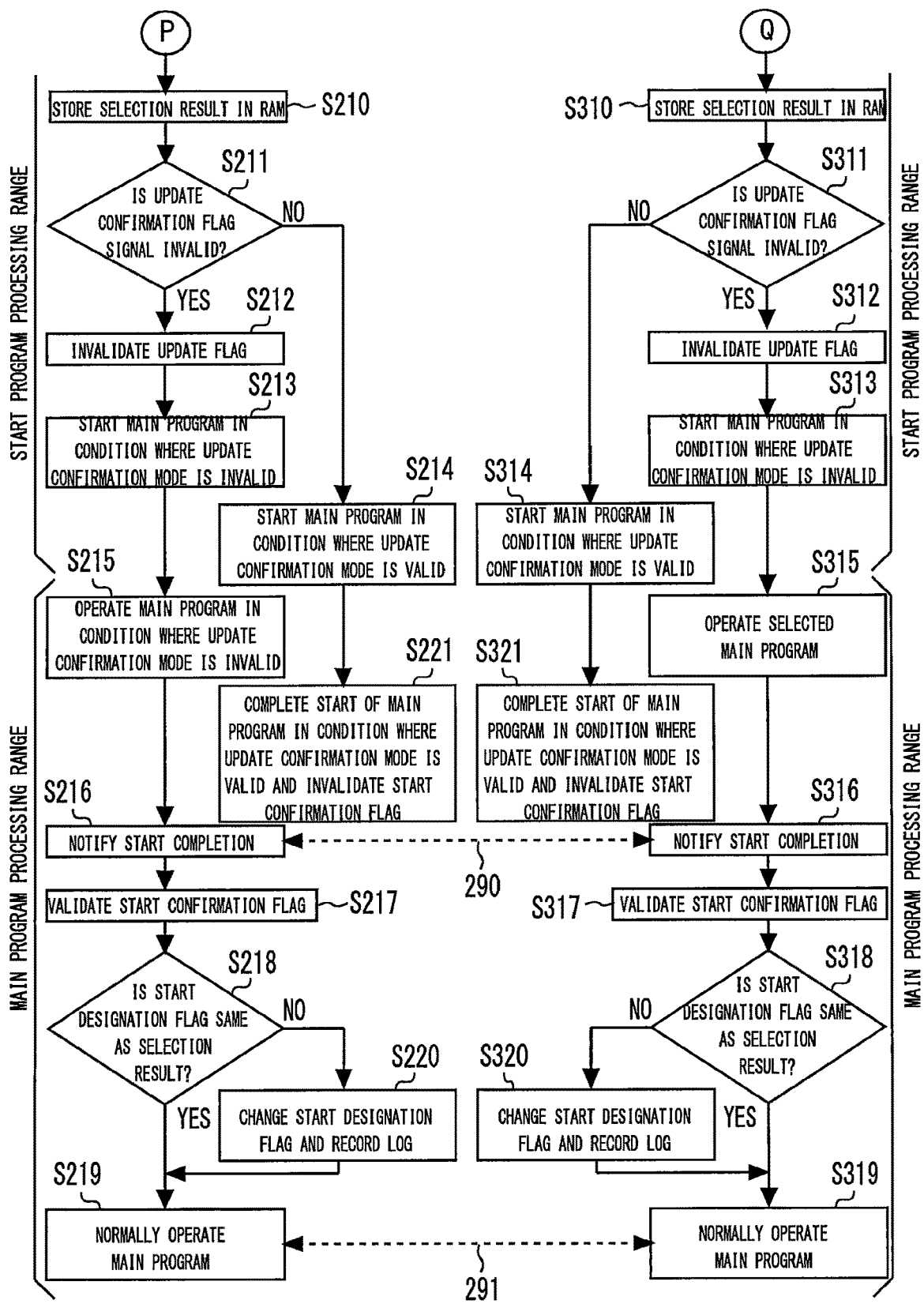
FIG. 14 is a flowchart illustrating start processing of the information processing device according to Embodiment 2 of the present invention.
Figure 15:
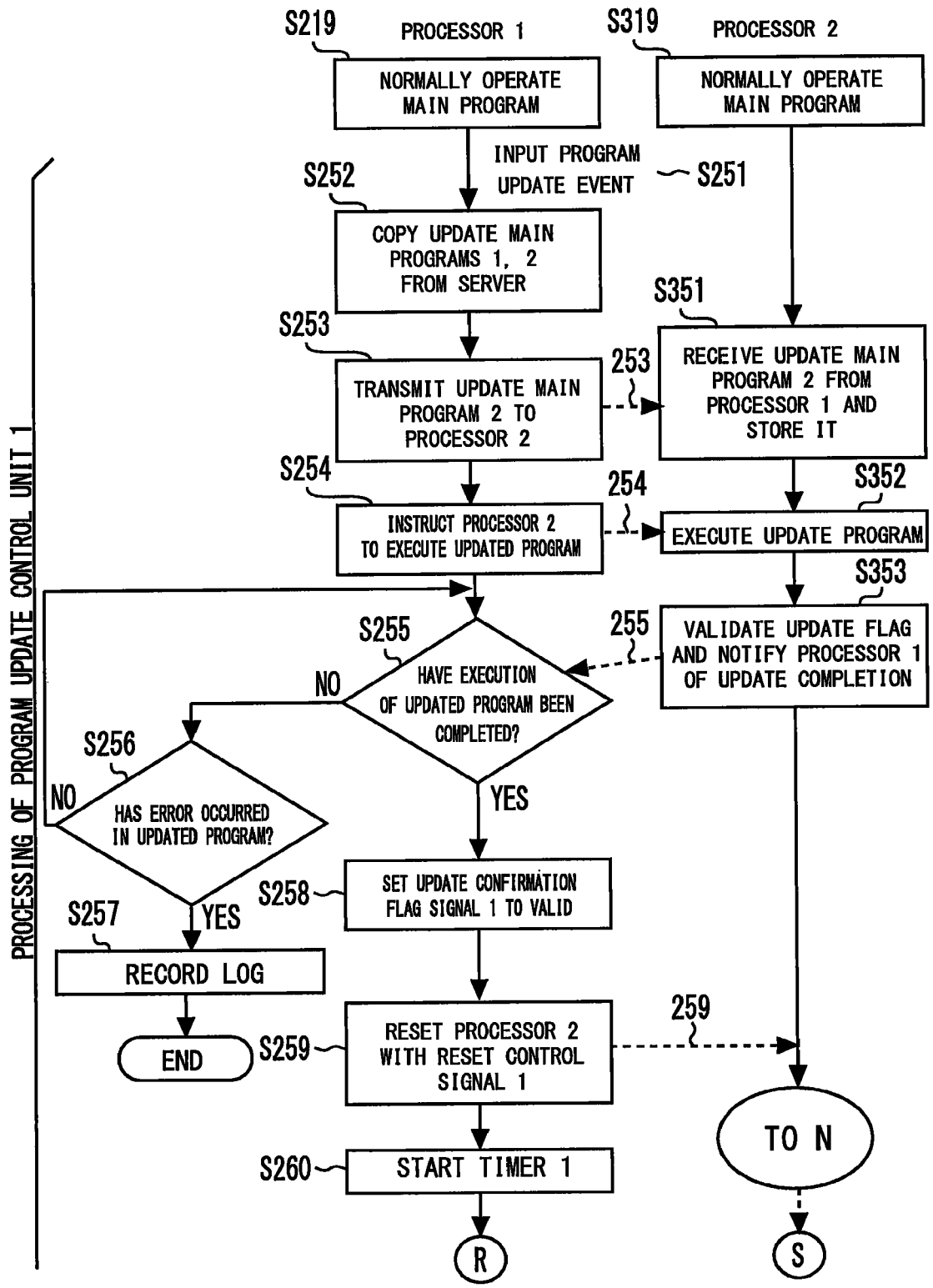
FIG. 15 is a flowchart illustrating program update processing of the information processing device according to Embodiment 2 of the present invention.
Figure 17:
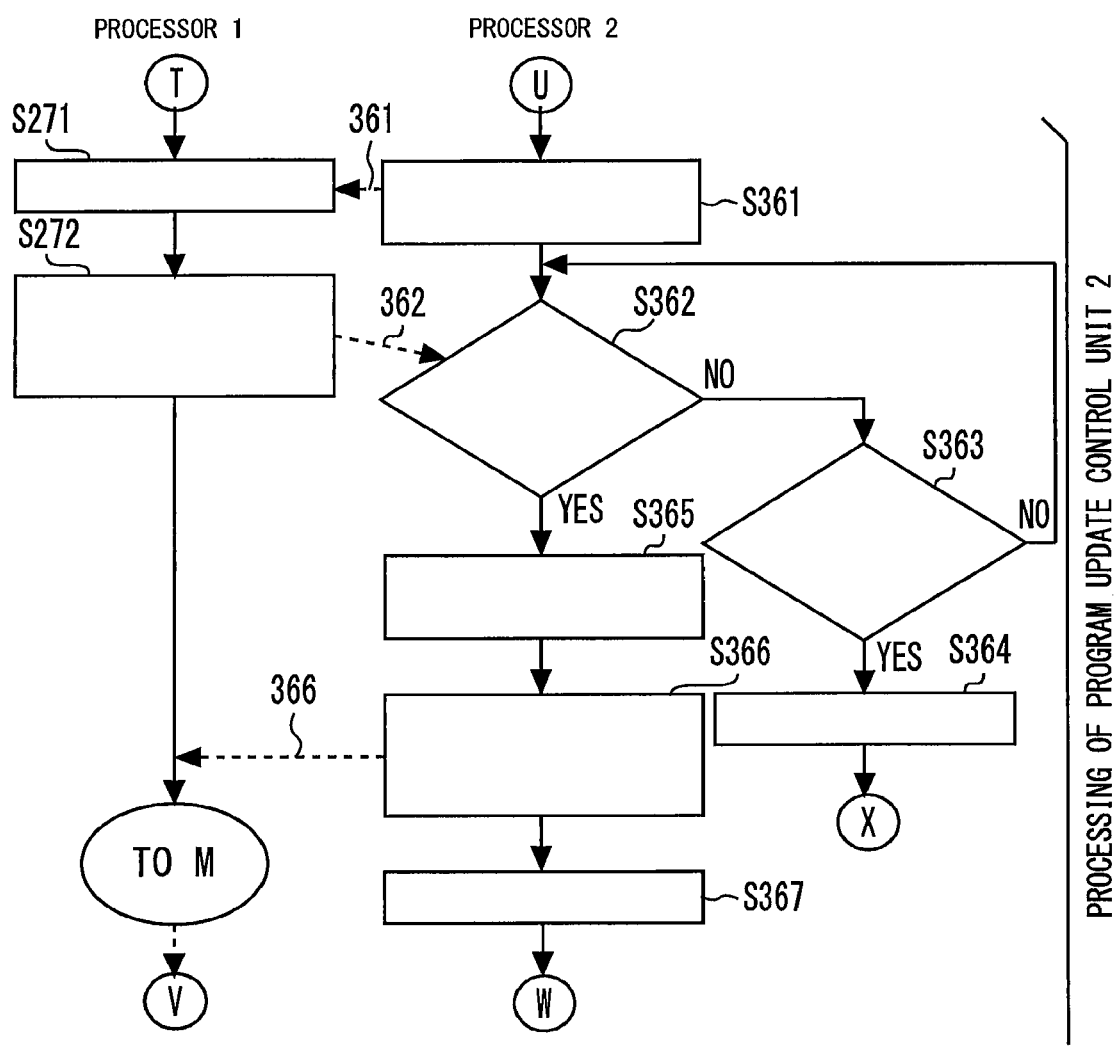
FIG. 17 is a flowchart illustrating program update processing of the information processing device according to Embodiment 2 of the present invention.

FIG. 12 to FIG. 18 are diagrams according to Embodiment 2 of the present invention. FIG. 12 is a block diagram illustrating a configuration of an information processing device. FIG. 13 and FIG. 14 each are a flowchart illustrating start processing of the information processing device. FIG. 15 to FIG. 18 each are a flowchart illustrating program update processing of the information processing device.

In Embodiment 1 described above, the first start designation flag is stored in the first non-volatile memory 102, and the second start designation flag is stored in the second non-volatile memory 112. That is, the start designation flags are separately stored in the first processor 101 side and in the second processor 111 side. On the other hand, in Embodiment 2 described here, the start designation flag is stored in one of the first processor 101 side and the second processor 111 side.

Hereinafter, an information processing device 10 according to Embodiment 2 will be described, mainly regarding differences from Embodiment 1. Here, a case where the start designation flag is stored in the second processor 111 side will be described. However, the start designation flag may be stored in the first processor 101 side.

FIG. 12 illustrates a configuration of the information processing device 10 according to Embodiment 2. As illustrated in FIG. 12, the configuration of the information processing device 10 according to Embodiment 2 is substantially similar to that according to Embodiment 1 illustrated in FIG. 2. However, the information processing device 10 according to Embodiment 2 is different from that according to Embodiment 1 in that the first non-volatile memory 102 does not store therein the first start designation flag.

The second non-volatile memory 112 stores therein only one start designation flag. The second processor 111 transmits a start designation flag signal to the first processor 101 to designate the first main program to be executed by the first processor 101. The start designation flag signal is a signal for designating which of the first main programs stored in the side A and the side B of the first non-volatile memory 102 is to be executed by the first processor 101.

The other configurations are similar to those of Embodiment 1, and the description thereof is omitted.

The start processing of the information processing device 10 configured as described above will be described with reference with FIG. 13 and FIG. 14. Each step in FIG. 13 and FIG. 14 denoted by the same reference sign as in FIG. 3 and FIG. 4 in Embodiment 1 has the same contents basically, and the description thereof is omitted. In Embodiment 2, after step S301 in FIG. 13, the process proceeds to step S331. In step S331, the second start control unit 145 refers to the start command flag stored in the second non-volatile memory 112, and sets the start designation flag signal. At this time, the start designation flag signal is preliminarily determined, for example, to be set at high level if the first main program A is designated, and at low level if the first main program B is designated. After step S331, the process proceeds to step S303.

In step S208 in FIG. 13, the first start control unit 135 refers to the start designation flag signal, and selects the first main program designated by the start designation flag signal. In step S209 in FIG. 13, the first start control unit 135 refers to the start designation flag signal, and selects the first main program not designated by the start designation flag signal. The other steps are similar to those in Embodiment 1.

The program update processing of the information processing device 10 configured as described above will be described with reference to FIG. 15 to FIG. 18. Each step in FIG. 15 to FIG. 18 denoted by the same reference sign as in FIG. 7 to FIG. 10 in Embodiment 1 has the same contents basically, and the description thereof is omitted. In Embodiment 2, the first processor 101 is reset without performing step S273 in FIG. 10 after step S221 in FIG. 18.

Figure 18:
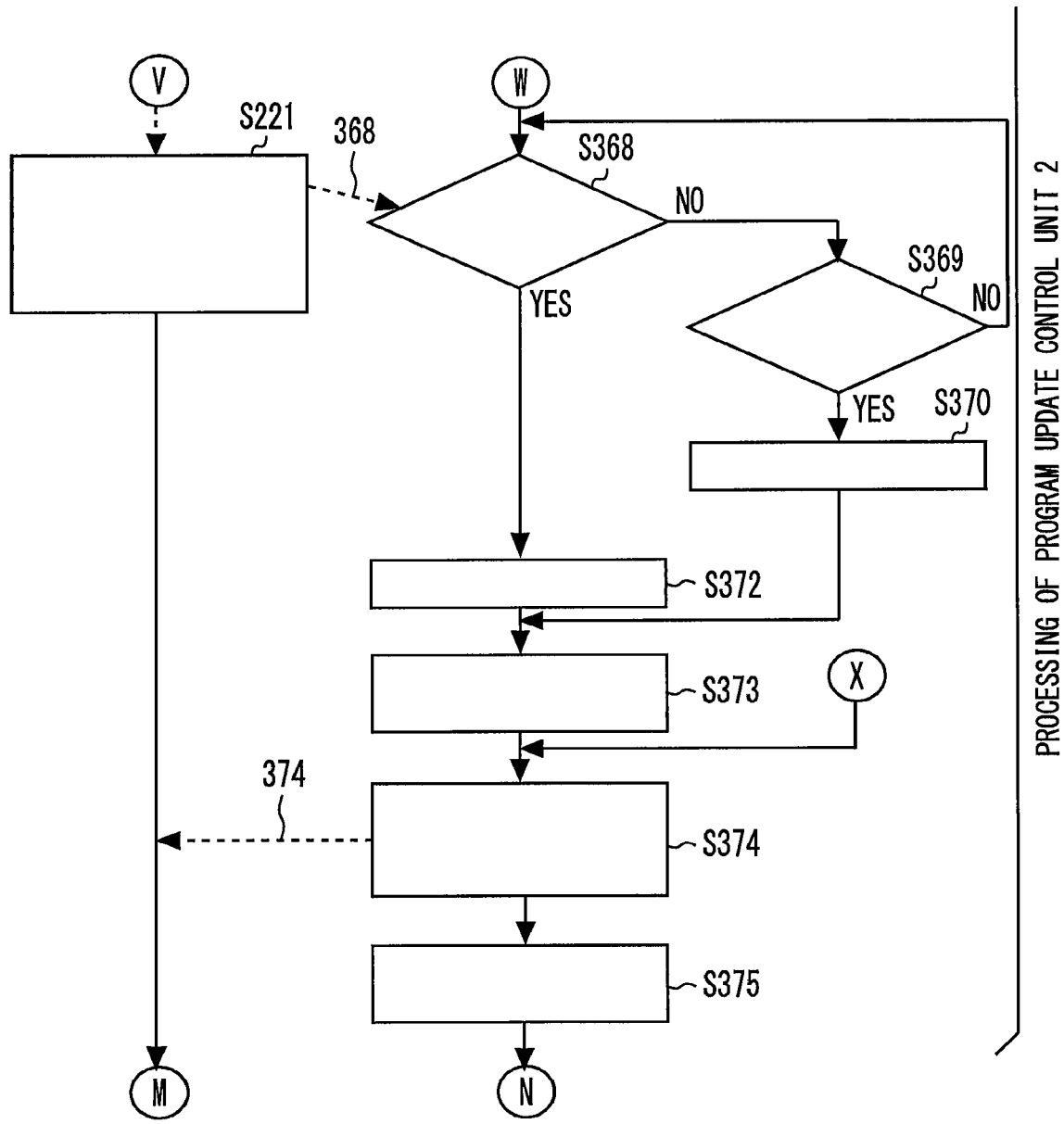
FIG. 18 is a flowchart illustrating program update processing of the information processing device according to Embodiment 2 of the present invention.

After step S368 in FIG. 18, the process proceeds to step S372 without performing step S371 in FIG. 10. In step S372, the second program update unit 141 updates the start designation flag stored in the second non-volatile memory 112 to designate the updated first main program and the updated second main program. The other steps are similar to those in Embodiment 1.

In the above-described configuration in Embodiment 1, if a power supply interruption occurs after the execution of step S371 and before the process of step S372 in FIG. 6, the contents of the first start designation flag change so that the updated first main program is not designated. Therefore, the contents of the first start designation flag stored in the first non-volatile memory 102 do not correspond to the contents of the second start designation flag stored in the second non-volatile memory 112.

On the other hand, in virtue of the configuration in Embodiment 2 configured as described above, in addition to a similar effect to Embodiment 1, only one start designation flag is used, thereby capable of preventing the designation of the first main program to be executed in the first processor 101 from not corresponding to the designation of the second main program to be executed in the second processor 111 even if the power supply interruption occurs.

Note that the update confirmation flag signal in step S373 is returned to the initial condition due to the power supply interruption. The update confirmation flag signal is set to invalid in the initial condition. Thus, the information processing device 10 can operate using the main program before the update at the initial start after the power supply interruption, or operate using the updated main program if the power supply interruption has occurred after the update of the start designation flag, thereby continuously operating without stopping the information processing device 10.

INDUSTRIAL APPLICABILITY

The present invention includes a memory that stores therein a main program, and a processor that reads out and executes the main program stored in the memory, and can be applied to an information processing device that needs to update the main program stored in the memory.

REFERENCE SIGNS LIST 10 information processing device
11 monitoring camera
12 communication network
15 server
16 PC
30 monitor panel
101 first processor
102 first non-volatile memory
103 first volatile memory
104 network controller
105 HDD
106 monitor
108 USB controller
109 USB memory
110 USB connector
111 second processor
112 second non-volatile memory
113 second volatile memory
114 car camera
121 serial communication line
131 first program update unit
134 first timer
135 first start control unit
141 second program update unit
144 second timer
145 second start control unit
500 elevator car
501 car door

The invention claimed is:

1. A program update method implemented by an information processing device that includes a first memory that stores therein a first main program, a first processor configured to read out and to execute the first main program stored in the first memory, a second memory that stores therein a second main program, and a second processor configured to read out and to execute the second main program stored in the second memory, the method comprising:
updating, by a first program update unit, the first main program stored in the first memory; and
starting, by a first start control unit, the first processor in an update confirmation mode when the first processor is reset after the first main program stored in the first memory is updated by the first program update unit,
generating, by the first processor, when being started in the update confirmation mode and prior to execution of the first main program, a first monitoring process that monitors whether a first main program process generated by the execution of the first main program is normally operated and outputting a first monitoring process start completion signal when the first processor has normally generated the first monitoring process and prior to the execution of the first main program and prior to the first monitoring process detecting whether an abnormality occurs in execution of the first main program process,
the method further comprising:
starting, by a second start control unit, the second processor in an update confirmation mode when the second processor is reset after the second main program stored in the second memory is updated by the second program update unit,
generating, by the second processor, when being started in the update confirmation mode, a second monitoring process that monitors whether a second main program process, that is different than the second monitoring process, generated by an execution of the second main program is normally operated, and outputting a second monitoring process start completion signal to the first processor when the second processor has normally generated the second monitoring process and prior to the second monitoring process being completed, and outputting, by the first processor, the first monitoring process start completion signal to the second processor when the first processor has normally generated the first monitoring process in the update confirmation mode.

2. An information processing device comprising:
a first memory that stores therein a first main program;
a first processor configured to read out and to execute the first main program stored in the first memory;
a first program update unit configured to update the first main program stored in the first memory; and
a first start control unit configured to start the first processor in an update confirmation mode when the first processor is reset after the first main program stored in the first memory is updated by the first program update unit,
wherein the first processor, when being started in the update confirmation mode and prior to execution of the first main program, generates a first monitoring process that monitors whether a first main program process generated by the execution of the first main program is normally operated and outputs a first monitoring process start completion signal when the first processor has normally generated the first monitoring process and prior to the execution of the first main program and prior to the first monitoring process detecting whether an abnormality occurs in execution of the first main program process,
the information processing device further comprising:
a second memory that stores therein a second main program;
a second processor configured to read out and to execute the second main program stored in the second memory;
a second program update unit configured to update the second main program stored in the second memory; and
a second start control unit configured to start the second processor in an update confirmation mode when the second processor is reset after the second main program stored in the second memory is updated by the second program update unit,
wherein the second processor, when being started in the update confirmation mode and prior to execution of the second main program, generates a second monitoring process that monitors whether a second main program process generated by an execution of the second main program is normally operated and outputs a second monitoring process start completion signal to the first processor when the second processor has normally generated the second monitoring process and prior to the second monitoring process being completed, and
the first processor outputs the first monitoring process start completion signal to the second processor when the first processor has normally generated the first monitoring process in the update confirmation mode.

3. The information processing device according to claim 2, wherein
the first memory has two memory surfaces of a side A and a side B, the first memory storing the first main program in each of the side A and the side B, the first memory also storing a start designation flag that designates from which side of the first memory the first main program is to be executed,
wherein the first processor reads out and executes the first main program from one of side A and side B based on the designation of the first start designation flag,
the first program update unit updates the first main program that is not designated by the first start designation flag from one of side A and side B, and
when the first processor is reset after the first main program stored in the first memory is updated by the first program update unit, the first start control unit sets the first start designation flag to designate a memory surface on which the first main program has been updated by the first program update unit.

4. An elevator device comprising:
an information processing device including:
a first memory that stores therein a first main program;
a first processor configured to read out and to execute the first main program stored in the first memory;
a first program update unit configured to update the first main program stored in the first memory;
a first start control unit configured to start the first processor in an update confirmation mode when the first processor is reset after the first main program stored in the first memory is updated by the first program update unit;
a second memory that stores therein a second main program;
a second processor configured to read out and to execute the second main program stored in the second memory;
a second program update unit configured to update the second main program stored in the second memory; and
a second start control unit configured to start the second processor in an update confirmation mode when the second processor is reset after the second main program stored in the second memory is updated by the second program update unit,
wherein the first processor, when being started in the update confirmation mode and prior to execution of the first main program, generates a first monitoring process that monitors whether a first main program process generated by the execution of the first main program is normally operated and outputs a first monitoring process start completion signal when the first processor has normally generated the first monitoring process and prior to the execution of the first main program and prior to the first monitoring process detecting whether an abnormality occurs in execution of the first main program process,
wherein the second processor, when being started in the update confirmation mode and prior to execution of the second main program, generates a second monitoring process that monitors whether a second main program process generated by an execution of the second main program is normally operated and outputs a second monitoring process start completion signal to the first processor when the second processor has normally generated the second monitoring process and prior to the execution of the second main program and prior to the second monitoring process detecting whether an abnormality occurs in execution of the second main program process, and
wherein the first processor outputs the first monitoring process start completion signal to the second processor when the first processor has normally generated the first monitoring process in the update confirmation mode;
a camera provided inside an elevator car, the camera configured to photograph the inside of the car and to output an analog image signal to the information processing device, and
a monitor provided inside the car, the monitor configured to receive an input of a digital image signal from the information processing device to display an image thereon, wherein the first processor processes the digital image signal output to the monitor from the information processing device, and the second processor processes the analog image signal input to the information processing device from the camera.

5. The elevator device according to claim 4, wherein the first memory has two memory surfaces of a side A and a side B, the first memory storing the first main program in each of the side A and the side B, the first memory also storing a start designation flag that designates from which side of the first memory the first main program is to executed, wherein the first processor reads out and executes the first main program from one of side A and side B based on the designation of the first start designation flag, the first program update unit updates the first main program that is not designated by the first start designation flag from one of side A and side B, and when the first processor is reset after the first main program stored in the first memory is updated by the first program update unit, the first start control unit sets the first start designation flag to designate a memory surface on which the first main program has been updated by the first program update unit.

* * * * *